(12) United States Patent
Ma

(10) Patent No.: US 12,145,671 B2
(45) Date of Patent: Nov. 19, 2024

(54) DATA TRANSMISSION APPARATUS, LIDAR, AND INTELLIGENT DEVICE

(71) Applicant: SUTENG INNOVATION TECHNOLOGY CO., LTD., Shenzhen (CN)

(72) Inventor: Dinglong Ma, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/144,830

(22) Filed: May 8, 2023

(65) Prior Publication Data

US 2023/0271646 A1 Aug. 31, 2023

Related U.S. Application Data

(63) Continuation of application No. 17/715,907, filed on Apr. 7, 2022, now Pat. No. 11,679,803, and a
(Continued)

(30) Foreign Application Priority Data

Oct. 10, 2019 (CN) .......................... 201910956298.6
Oct. 10, 2019 (CN) .......................... 201910956308.6
Mar. 4, 2020 (WO) ................ PCT/CN2020/083357

(51) Int. Cl.
*B62D 6/00* (2006.01)
*A01D 34/00* (2006.01)
(Continued)

(52) U.S. Cl.
CPC .............. *B62D 6/00* (2013.01); *A01D 34/008* (2013.01); *G01S 7/4817* (2013.01); *B62D 5/0457* (2013.01)

(58) Field of Classification Search
CPC ...... B62D 6/00; B62D 5/0457; A01D 34/008; G01S 7/4817; G01S 7/4813; G02B 6/3604
See application file for complete search history.

(56) References Cited

U.S. PATENT DOCUMENTS

| | | | | |
|---|---|---|---|---|
| 5,016,961 A | * | 5/1991 | Aldrich ................ | H04B 10/801 385/25 |
| 2010/0208318 A1 | * | 8/2010 | Jensen .................... | G01S 17/89 359/200.7 |

(Continued)

FOREIGN PATENT DOCUMENTS

| | | |
|---|---|---|
| CN | 103954834 A | 7/2014 |
| CN | 205861895 U | 1/2017 |

(Continued)

OTHER PUBLICATIONS

First Office Action issued in related Chinese Application No. 201910956298.6, mailed Nov. 21, 2019, 15 pages.
(Continued)

*Primary Examiner* — Isam A Alsomiri
*Assistant Examiner* — Sanjida Naser
(74) *Attorney, Agent, or Firm* — BAYES PLLC

(57) ABSTRACT

A LiDAR system is provided. The LiDAR system includes a first data transmission apparatus, a second data transmission apparatus, a rotator, and a central shaft. The first data transmission apparatus and the second data transmission apparatus are located in the LiDAR system. The rotator is connected with the central shaft through a bearing, the rotator is connected to a bearing rotor, and the central shaft is connected to a bearing stator. The first data transmission apparatus includes a first optical module and a second
(Continued)

optical module. The second data transmission apparatus includes a third optical module, a coupling optical system, and a fourth optical module.

4 Claims, 19 Drawing Sheets

Related U.S. Application Data continuation of application No. PCT/CN2020/115989, filed on Sep. 17, 2020.

(51) Int. Cl.
*B62D 5/04* (2006.01)
*G01S 7/481* (2006.01)

(56) References Cited

U.S. PATENT DOCUMENTS

| | | | |
|---|---|---|---|
| 2019/0033430 A1 | 1/2019 | Ingram et al. | |
| 2019/0179028 A1* | 6/2019 | Pacala | H05K 1/0274 |

FOREIGN PATENT DOCUMENTS

| | | | |
|---|---|---|---|
| CN | 106597466 A | | 4/2017 |
| CN | 106842170 A | | 6/2017 |
| CN | 106842221 A | | 6/2017 |
| CN | 207339856 U | | 5/2018 |
| CN | 108107442 A | | 6/2018 |
| CN | 108270486 A | | 7/2018 |
| CN | 108809424 A | | 11/2018 |
| CN | 109828286 A | | 5/2019 |
| CN | 109839647 A | | 6/2019 |
| CN | 109844593 A | | 6/2019 |
| CN | 109932703 A | | 6/2019 |
| CN | 109946678 A | | 6/2019 |
| CN | 109983715 A | | 7/2019 |
| CN | 110018462 A | | 7/2019 |
| CN | 110018463 A | | 7/2019 |
| CN | 209170376 U | | 7/2019 |
| CN | 110226276 A | | 9/2019 |
| CN | 109839647 B | * | 9/2020 |
| KR | 20190083145 A | | 7/2019 |

OTHER PUBLICATIONS

Second Office Action issued in related Chinese Application No. 201910956298.6, mailed Dec. 18, 2019, 13 pages.
First Office Action issued in related Chinese Application No. 201910956308.6, mailed Nov. 21, 2019, 64 pages.
Second Office Action issued in related Chinese Application No. 201910956308.6, mailed Dec. 18, 2019, 51 pages.
Third Office Action issued in related Chinese Application No. 201910956308.6, mailed Jan. 10, 2020, 52 pages.

* cited by examiner

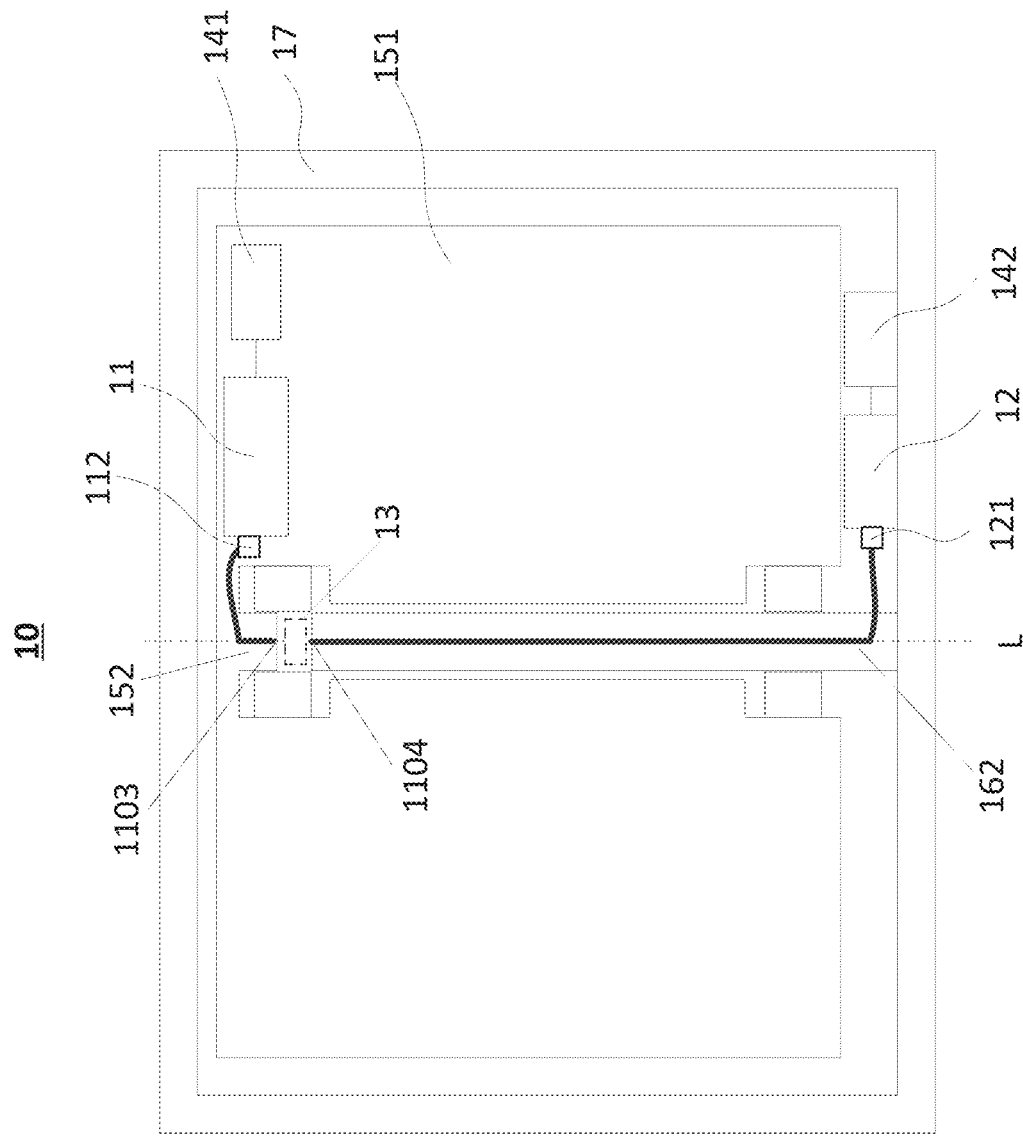

DATA TRANSMISSION APPARATUS, LIDAR, AND INTELLIGENT DEVICE

CROSS-REFERENCE TO RELATED APPLICATION

The present application is a continuation of application Ser. No. 17/715,907, filed Apr. 7, 2022, which is a continuation of International Application No. PCT/CN2020/115989, filed Sep. 17, 2020, which further claims the benefit of priority to China Patent Application No. CN201910956298.6, filed Oct. 10, 2019, China Patent Application No. CN201910956308.6, filed Oct. 10, 2019, and International Application No. PCT/CN2020/083357, filed Apr. 3, 2020. The contents of the abovementioned applications are incorporated herein by reference in their entireties.

TECHNICAL FIELD

The present disclosure relates to the technical field of a LiDAR, and particularly to a data transmission apparatus, a LiDAR, and an intelligent device.

BACKGROUND

A LiDAR (Light Detection and Ranging, LiDAR) is a sensor that uses laser to detect and measure a distance. The LiDAR measures a distance from a target and reflectivity of the target by emitting laser pulses to the target and measuring the delay and intensity of a return pulse. The LiDAR generally uses a mechanical rotating apparatus to implement 360-degree spatial scanning. Each pair of apparatuses that continuously emit and receive laser pulses with a mechanical rotation is referred to as a scanning "line" of the LiDAR. Because the LiDAR is widely used in technical fields such as automatic driving and intelligent perception, the LiDAR is required to have higher spatial resolution, and hence a larger number of lines.

A part of the LiDAR that rotates with the mechanical rotating apparatus is referred to as a LiDAR front-end system. The detected laser pulses are converted into point cloud data after passing through the LiDAR front-end system. A communication apparatus is required for wireless data transmission of the point cloud data.

However, during implementation of the present disclosure, the inventor found that the current LiDAR uses a wireless communication apparatus based on electromagnetic coupling to achieve the above-mentioned point cloud data transmission. However, limited by a nature of a physical transmission medium, the wireless communication apparatus based on electromagnetic coupling may not meet the requirement of a large number of lines. As a result, data transmission efficiency is relatively low.

SUMMARY

The objective of embodiments of the present disclosure is to provide a data transmission apparatus, a LiDAR, and an intelligent device, to improve data transmission efficiency by using light as a data transmission medium.

An embodiment of the present disclosure proposes a data transmission apparatus. The apparatus is located in a LiDAR system, and the LiDAR system includes a rotator and a central shaft; the data transmission apparatus includes a first optical module, a coupling optical system, and a second optical module, the first optical module is arranged at the rotator, the second optical module is arranged at the central shaft, and the coupling optical system is arranged between the first optical module and the second optical module; the first optical module is configured to receive a first digital signal output by a LiDAR front-end apparatus and convert the first digital signal into an optical signal; the coupling optical system includes an annular lens, and the annular lens is arranged around the central shaft and is configured to adjust a propagation direction of the optical signal output by the first optical module and transmit the optical signal to the second optical module; and the second optical module is configured to convert the optical signal into the first digital signal and output the first digital signal to an upper application apparatus.

An embodiment of the present disclosure proposes a data transmission apparatus, where the apparatus is located in a LiDAR system, and the LiDAR system includes a rotator and a central shaft; the apparatus includes: a first optical module and a second optical module; the first optical module is configured to receive a first digital signal output by a LiDAR front-end apparatus, convert the first digital signal into an optical signal, and send the optical signal to a receiving terminal of the second optical module through an emitting terminal of the first optical module; the second optical module receives the optical signal from the first optical module by using the receiving terminal, and converts the optical signal into the first digital signal; and the emitting terminal of the first optical module and the receiving terminal of the second optical module are oppositely arranged at the central shaft.

An embodiment of the present disclosure further proposes a LiDAR, including a LiDAR front-end apparatus, an upper application apparatus, and a data transmission apparatus according to the foregoing embodiments; the LiDAR front-end apparatus is configured to receive light information reflected by a target object, and convert the light information into a first digital signal; the data transmission apparatus is configured to transmit the first digital signal to the upper application apparatus; the upper application apparatus is configured to convert control information into a second digital signal; and the data transmission apparatus is further configured to transmit the second digital signal to the LiDAR front-end apparatus.

An embodiment of the present disclosure further proposes an intelligent apparatus, including the foregoing LiDAR.

In this embodiment, light is used as a data transmission medium for data transmission. Because of a large communication capacity, great anti-electromagnetic interference performance, and great transmission quality of optical communication, data transmission efficiency may be improved.

The foregoing descriptions are only brief descriptions of the technical solutions in the embodiments of the present disclosure. To understand the technical means in the embodiments of the present disclosure more clearly so that they may be carried out according to the content of the specification, and to make the foregoing and other objectives, characteristics and advantages of the embodiments of the present disclosure more apparent and understandable, specific implementations of the present disclosure will be illustrated particularly below.

BRIEF DESCRIPTION OF DRAWINGS

One or more embodiments are described by using examples with reference to diagrams in accompanying drawings corresponding to the embodiments. These exemplary descriptions do not constitute a limitation to the embodiments. Elements with the same reference numerals in the accompanying drawings indicate same or similar elements. Unless otherwise stated, the diagrams in the accompanying drawings do not constitute a proportional limitation.

FIG. 5a to FIG. 5e show schematic structural diagrams of a data transmission apparatus with an on-shaft design provided by an embodiment of the present disclosure;

DETAILED DESCRIPTION

The following describes exemplary embodiments of the present disclosure in a more detailed manner with reference to accompanying drawings. Although the accompanying drawings show the example embodiments of the present disclosure, it should be understood that the present disclosure may be implemented in various forms and should not be limited to the embodiments described herein. On the contrary, these embodiments are provided for more thoroughly understanding the present disclosure and completely informing a person of ordinary skill in the art about the scope of the present disclosure.

Figure 1:
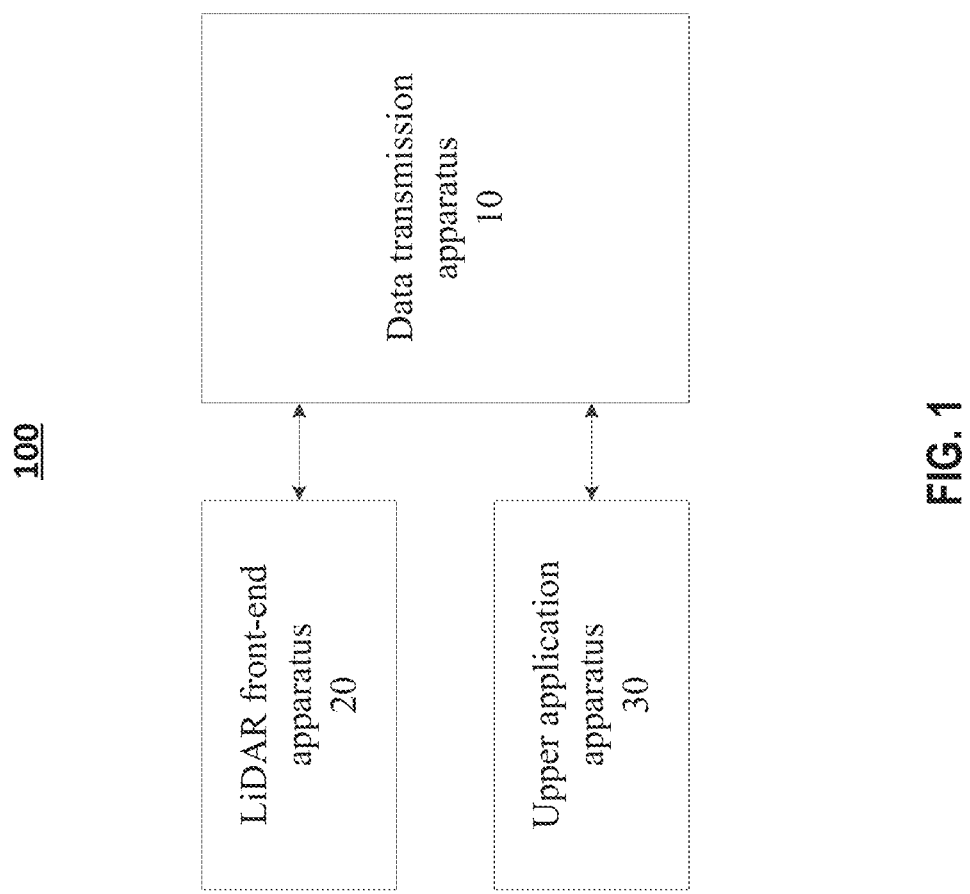
FIG. 1 shows a schematic structural diagram of a LiDAR system provided by an embodiment of the present disclosure.

FIG. 1 shows a schematic structural diagram of a LiDAR system provided by an embodiment of the present disclosure. As shown in FIG. 1, the LiDAR system 100 includes a data transmission apparatus 10, a LiDAR front-end apparatus 20, and an upper application apparatus 30.

The LiDAR front-end apparatus 20 is connected to one end of the data transmission apparatus 10, and the other end of the data transmission apparatus 10 is connected to the upper application apparatus 30. The LiDAR front-end apparatus 20 is configured to receive light information reflected by a target object and convert the light information into a first digital signal. The data transmission apparatus 10 is configured to transmit the first digital signal output by the LiDAR front-end apparatus 20 to the upper application apparatus 30. The upper application apparatus 30 is configured to receive the first digital signal and process the first digital signal. In the foregoing manner, detection data of the target object detected by the LiDAR front-end apparatus 20 is transmitted to the upper application apparatus 30 through the data transmission apparatus 10 for processing, thereby obtaining object detection information.

That the LiDAR front-end apparatus 20 is configured to receive light information reflected by a target object and convert the light information into a first digital signal specifically includes: the LiDAR front-end apparatus receives the light information reflected by the target object, converts the light information reflected by the target object into an electrical signal, and converts the electrical signal into the first digital signal. The LiDAR front-end apparatus 20 transmits the first digital signal to the data transmission apparatus 10.

The upper application apparatus 30 may be any type of terminal device with a user interaction function and a computing capability, for example, an intelligent car terminal, a drone terminal, or other terminal devices that may be mounted on an intelligent car or a drone.

In some embodiments, the upper application apparatus 30 is further configured to receive control instruction information and convert the received control instruction information into a second digital signal. The data transmission apparatus 10 is further configured to transmit the second digital signal output by the upper application apparatus 30 to the LiDAR front-end apparatus 20, and the LiDAR front-end apparatus 20 is further configured to receive the second digital signal and respond to the second digital signal. In the foregoing manner, the upper application apparatus 30 transmits a user-input control instruction to the LiDAR front-end apparatus 20 through the data transmission apparatus 10, thereby controlling the LiDAR front-end apparatus 20.

Figure 2:
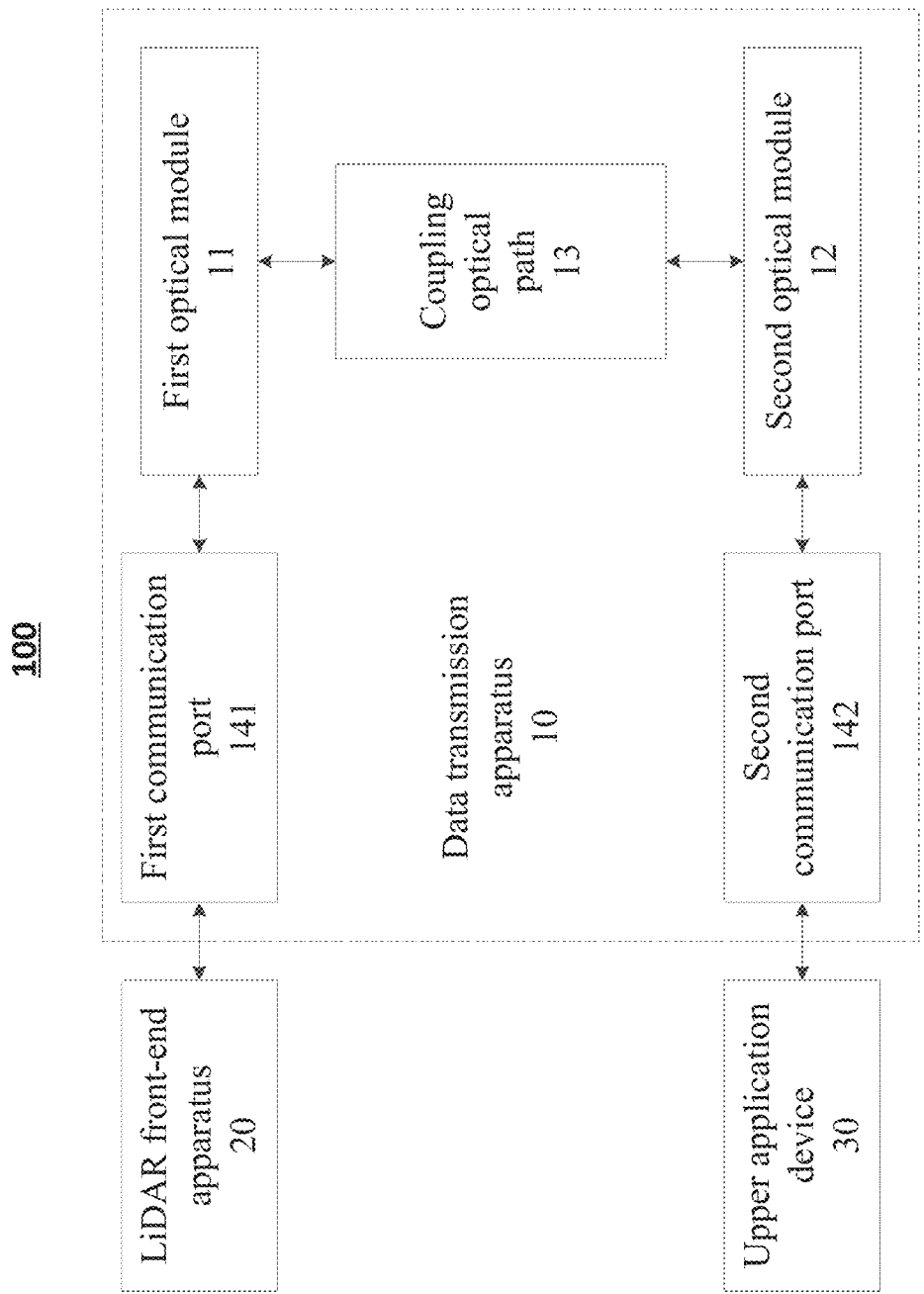
FIG. 2 shows a schematic structural diagram of a data transmission apparatus provided by an embodiment of the present disclosure.
Figure 3:
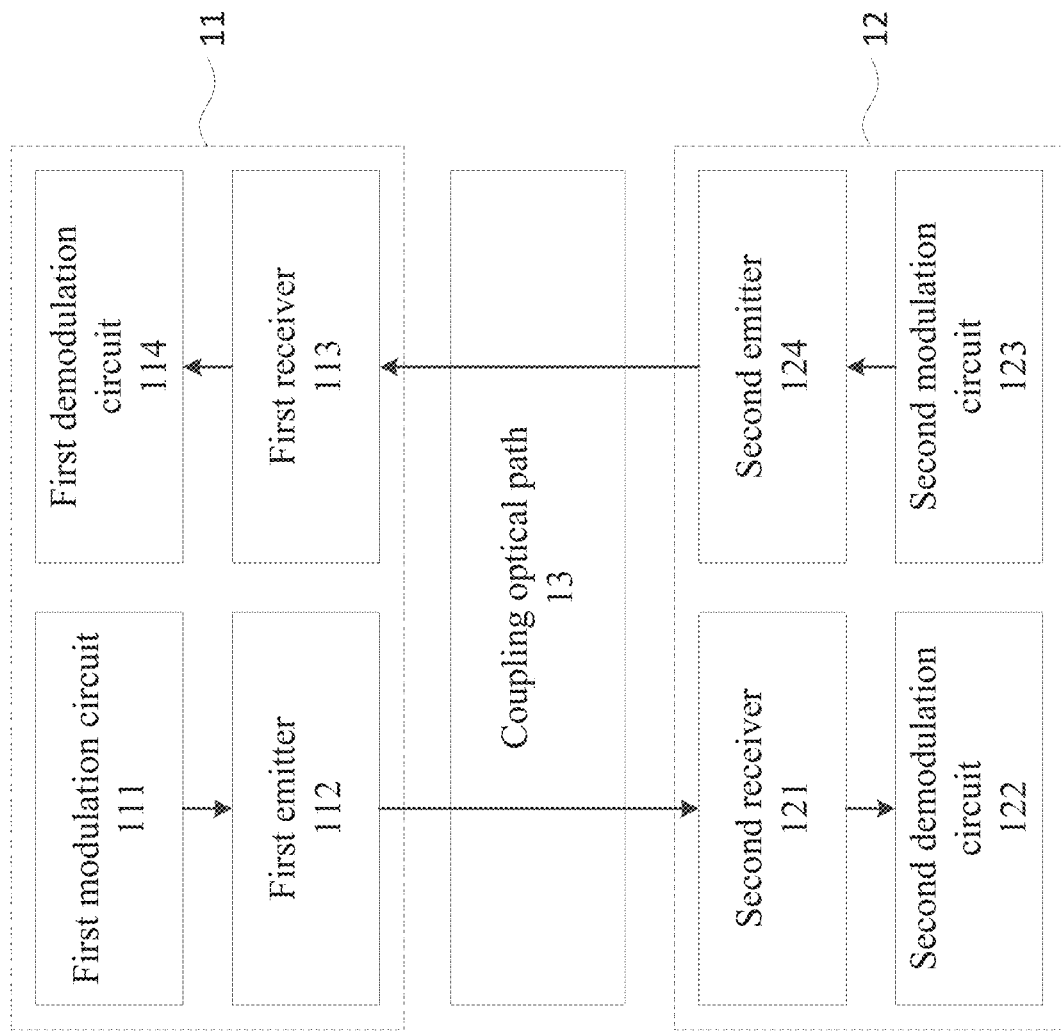
FIG. 3 shows a schematic structural diagram of a first optical module and a second optical module of FIG. 2.

As shown in FIG. 2, the data transmission apparatus 10 includes a first optical module and a second optical module. The first optical module 11 is communicatively connected to the LiDAR front-end apparatus 20, and the second optical module 12 is communicatively connected to the upper application apparatus 30. As shown in FIG. 3, both the first optical module 11 and the second optical module 12 have a transceiver module. Therefore, an uplink signal and a downlink signal may be transmitted at the same time, that is, LiDAR ranging data and control data may be transmitted simultaneously.

The following embodiments are described by using downlink signal transmission as an example.

FIG. 2 shows a schematic structural diagram of a data transmission apparatus provided by an embodiment of the present disclosure. As shown in FIG. 2, the data transmission apparatus 10 includes: a first optical module 11, a second optical module 12, and a coupling optical system 13.

The coupling optical system 13 is arranged between the first optical module 11 and the second optical module 12. The first optical module 11 is communicatively connected to a LiDAR front-end apparatus 20, and the second optical module 12 is communicatively connected to an upper application apparatus 30. The first optical module 11 is configured to receive a first digital signal output by the LiDAR front-end apparatus 20 and convert the first digital signal into an optical signal. The coupling optical system 13 is configured to transmit the optical signal output by the first optical module 11 to the second optical module 12. The second optical module 12 is configured to convert the optical signal into the first digital signal and output the first digital signal to the upper application apparatus 30 for processing.

Specifically, referring to FIG. 3 together, the first optical module 11 includes a first modulation circuit 111 and a first emitter 112. One end of the first modulation circuit 111 is connected to the LiDAR front-end apparatus 20, and the other end of the first modulation circuit 111 is connected to the first emitter 112. The second optical module 12 includes a second receiver 121 and a second demodulation circuit 122. One end of the second demodulation circuit 122 is connected to the second receiver 121, and the other end of the second demodulation circuit 122 is connected to the upper application apparatus 30. In this embodiment, the first modulation circuit 111 is configured to modulate the first digital signal output by the LiDAR front-end apparatus 20 into an optical signal. The first emitter 112 is configured to receive the optical signal output by the first modulation circuit 111 and emit the optical signal to the coupling optical system 13. The coupling optical system 13 transmits the optical signal to the second receiver 121. The second receiver 121 is configured to receive the optical signal transmitted by the coupling optical system 13. The second demodulation circuit 122 is configured to demodulate the optical signal output by the second receiver 121 into the first digital signal, and output the first digital signal to the upper application apparatus 30. The upper application apparatus 30 processes the received first digital signal to obtain ranging data.

Referring to FIG. 2 again, the apparatus 10 further includes a first communication port 141 and a second communication port 142. The first communication port 141 is respectively connected to the first optical module 11 and the LiDAR front-end apparatus 20. Specifically, the first communication port 141 is respectively connected to the first modulation circuit 111 and a first demodulation circuit 114. The second communication port 142 is respectively connected to the second demodulation circuit 122 and a second modulation circuit 123. The first communication port 141 is configured to transmit data between the first optical module 11 and the LiDAR front-end apparatus 20. The second communication port 142 is respectively connected to the second optical module 12 and the upper application apparatus 30. The second communication port 142 is configured to transmit data between the second optical module 12 and the upper application apparatus 30.

The data transmission apparatus 10 in the embodiment of the present disclosure receives the first digital signal output by the LiDAR front-end apparatus 20 through the first optical module 11, and converts the first digital signal into the optical signal, the coupling optical system 13 transmits the optical signal from the first optical module 11 to the second optical module 12, and the second optical module 12 converts the optical signal into the first digital signal and outputs the first digital signal to the upper application apparatus 30 for processing. It may be seen that, in this embodiment, light is used as a medium for data transmission. Because of a large communication capacity, great anti-electromagnetic interference performance, and great transmission quality of optical communication, data transmission efficiency may be improved.

Specifically, please refer to FIG. 4a to FIG. 5e together, the data transmission apparatus 10 is located in the LiDAR system 100. The LiDAR system 100 includes a rotor 15, a stator 16, and a housing 17. The rotor 15 and the stator 16 are received in the housing 17. The rotor 15 includes a rotator 151. The stator 16 includes a central shaft 161. The rotor 15 rotates around the central shaft 161, and the stator 16 is fixedly connected to the housing 17. The first optical module 11 is arranged at the rotor 15, and the second optical module 12 is arranged at the stator 16. The first optical module 11 rotates with the rotor 15, and the second optical module 12, the stator 16, and the housing 17 remain relatively stationary.

Figure 4A:
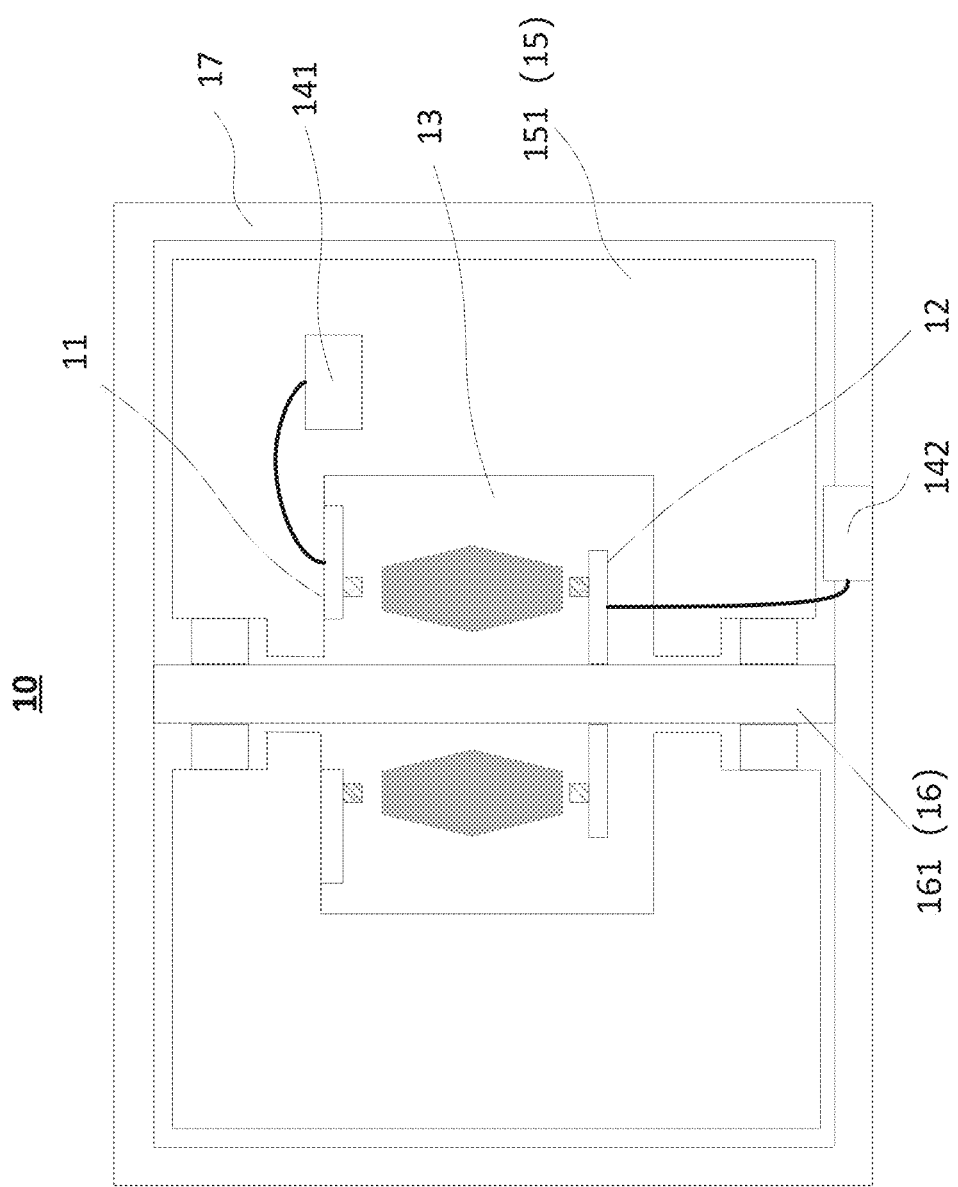
FIG. 4a to FIG. 4d show schematic structural diagrams of a data transmission apparatus with an out-of-shaft design provided by an embodiment of the present disclosure.

As shown in FIG. 4a, the data transmission apparatus 10 may be an out-of-shaft design in which a coupling optical path is not on the central shaft, and relative positions of the first emitter 112 of the first optical module 11 and the second receiver 121 of the second optical module 12 change significantly when the apparatus 10 rotates. The first optical module 11 is arranged at the rotator 151, and the second optical module 12 is arranged on the central shaft 161. It may be understood that the data transmission apparatus 10 further includes the coupling optical system 13, and the coupling optical system 13 is arranged between the first optical module 11 and the second optical module 12. The coupling optical system 13 is configured to form a coupling optical path through an optical element, and transmit the optical signal output by the first optical module 11 to the second optical module 12. It may be understood that the coupling optical path may be in a direction parallel to a central shaft, or a direction perpendicular to the central shaft, or may be arranged in sections. This is not limited herein. This specification uses the coupling optical path of the out-of-shaft data transmission apparatus shown in FIG. 4a as an example to describe the following embodiments.

It may be understood that the data transmission apparatus 10 further includes the first communication port 141 and the second communication port 142. The first communication port 141 is respectively connected to the first modulation circuit 111 of the first optical module 11 and the LiDAR front-end apparatus 20. The second communication port 142 is connected to the second demodulation circuit 122 of the second optical module 12 and the upper application apparatus 30.

In some other embodiments, the coupling optical system 13 of the data transmission apparatus 10 may include an annular lens 181. The central shaft 161 passes through a hollow part of the annular lens 181, and the annular lens 181 and the second optical module 12 are relatively stationary. When the rotator 151 rotates, the first optical module 11 rotates around the central shaft 161, and the central shaft 161, the housing 17, the second optical module 12, and the annular lens 181 remain relatively stationary. The annular lens 181 is configured to receive the optical signal emitted by the first emitter 112 of the first optical module 11 and adjust the optical signal, so that the optical signal enters the second optical module 12, and the second receiver 121 of the second optical module 12 is configured to receive the adjusted optical signal.

Figure 4B:
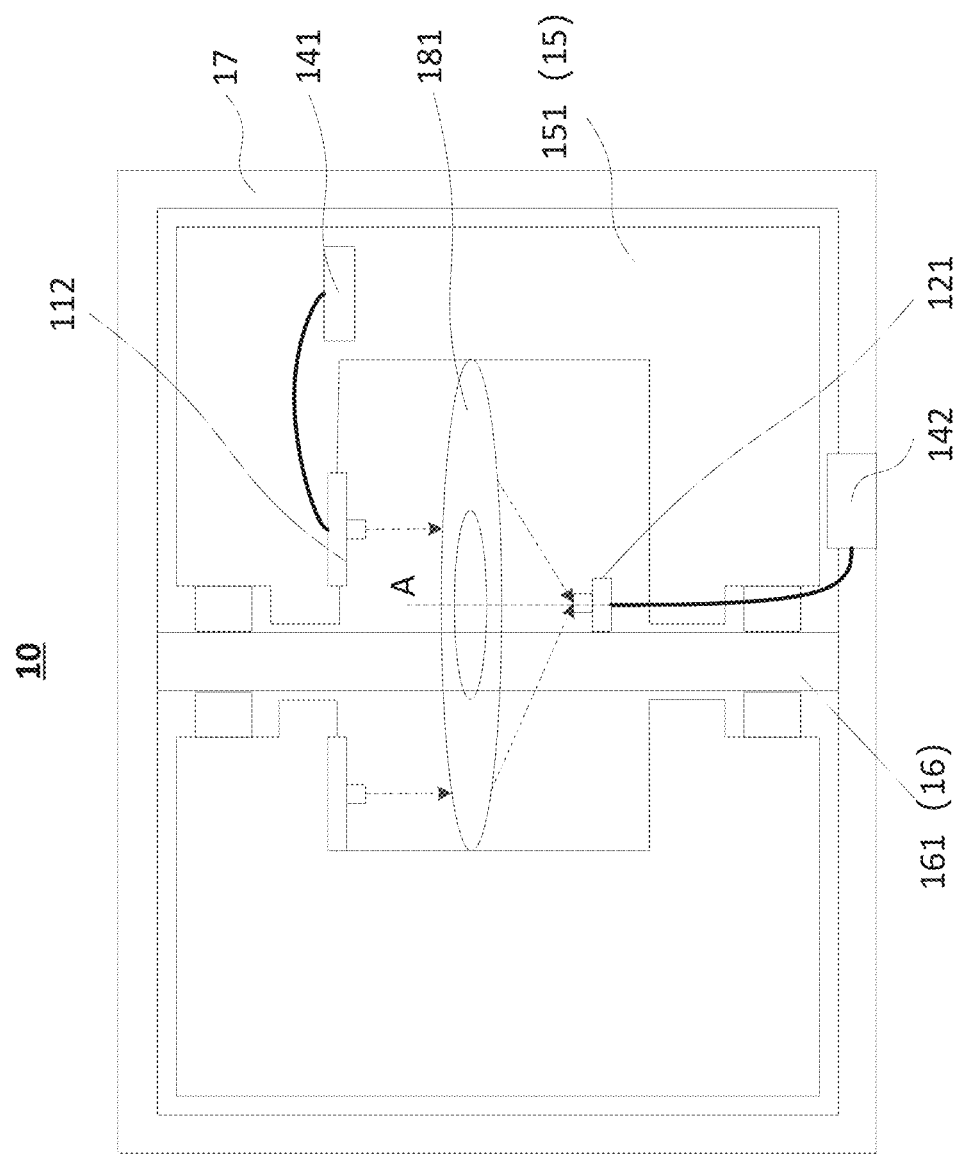

The annular lens 181 may be arranged in many ways. Optionally, in some other embodiments, as shown in FIG. 4b, the annular lens 181 is eccentrically arranged at the central shaft 161. The first emitter 112 emits the optical signal in a direction parallel to an optical axis A of the annular lens 181 to the annular lens 181. The annular lens 181 refracts the optical signal, and converges and emits the optical signal to the second receiver 121 so that the second receiver 121 receives the optical signal emitted by the first emitter 112. It may be understood that the first transmitter 112 may be provided with a collimating lens at an emitting terminal, so that the optical signal is emitted in a direction parallel to the optical axis A of the annular lens 181. It may be understood that a receiving terminal of the second receiver 121 may be arranged at an image-side focal plane of the annular lens 181. When the receiving terminal of the second receiver 121 is arranged at an image-side focal point of the annular lens 181, reception efficiency of the second receiver 121 is maximum. During rotation, the optical signal emitted by the first emitter 112 is always focused on the second receiver 121, thereby ensuring energy of a signal beam.

Figure 4C:
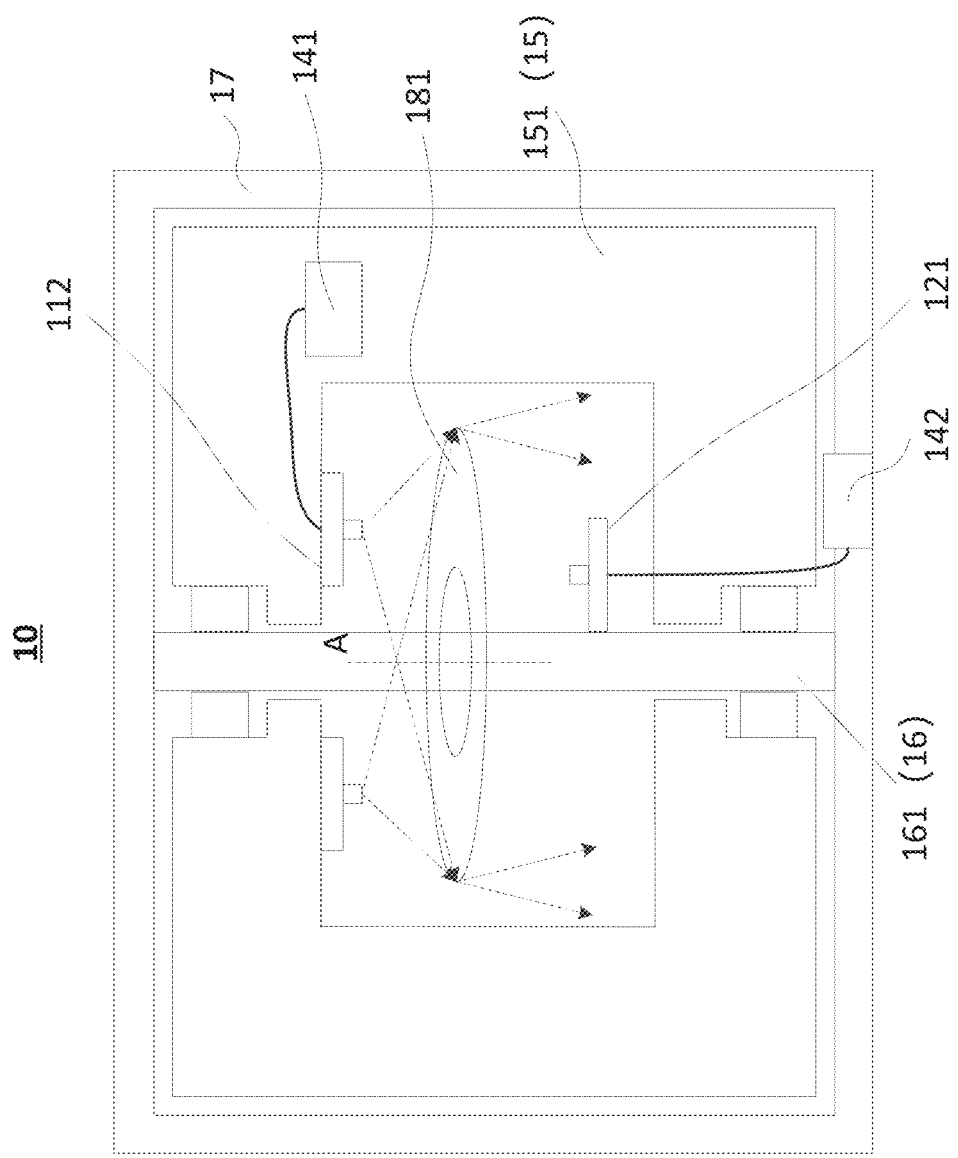

Optionally, in some embodiments, as shown in FIG. 4c, the annular lens 181 is arranged at the central shaft, and an optical center of the annular lens 181 may be located on the central shaft 161. The first emitter 112 emits the optical signal to the annular lens 181, and the annular lens 181 receives the optical signal emitted by the first emitter 112, homogenizes the received optical signal, and then emits the received optical signal to the second receiver 121 to be received by the second receiver 121. Optionally, the annular lens 181 in FIG. 4c may also be replaced by a diffuse uniform optical sheet. It may be understood that the first emitter 112 may be arranged on an object-side focal plane of the annular lens 181. When the first emitter 112 is arranged at the object-side focal point of the annular lens 181, the optical signal is emitted through the annular lens 181 in parallel, that is, the annular lens 181 plays a role in homogenizing the optical signal.

It may be understood that to prevent light emitted by the first emitter 112 from being blocked by the central shaft 161, it is optimal that at least two first emitters 112 are set, and the at least two first emitters 112 are arranged at equal spacing along the central shaft 161. In FIG. 4b and FIG. 4c, the two first emitters 112 are used as an example. The two first emitters 112 are respectively and symmetrically arranged on two sides of the central shaft 161. The two first emitters 112 are both configured to emit optical signals, and content of the optical signals emitted by the two first emitters 112 is the same, so as to prevent the central shaft 161 from being blocked and hence interrupting the optical signal. In FIG. 4c, the optical signals emitted by the two first emitters 112 are emitted in parallel after passing through the annular lens 181 but are not parallel to each other. Therefore, after the optical signals emitted by the two first emitters 112 pass through the annular lens 181, beam irradiation areas overlap with each other. It may be understood that in some optional embodiments, the second receiver 121 may be arranged in an area where beams overlap with each other, so as to ensure energy of a signal beam received by the second receiver 121, and reduce impact of an emitted beam being blocked by the central shaft 161.

Figure 4D:
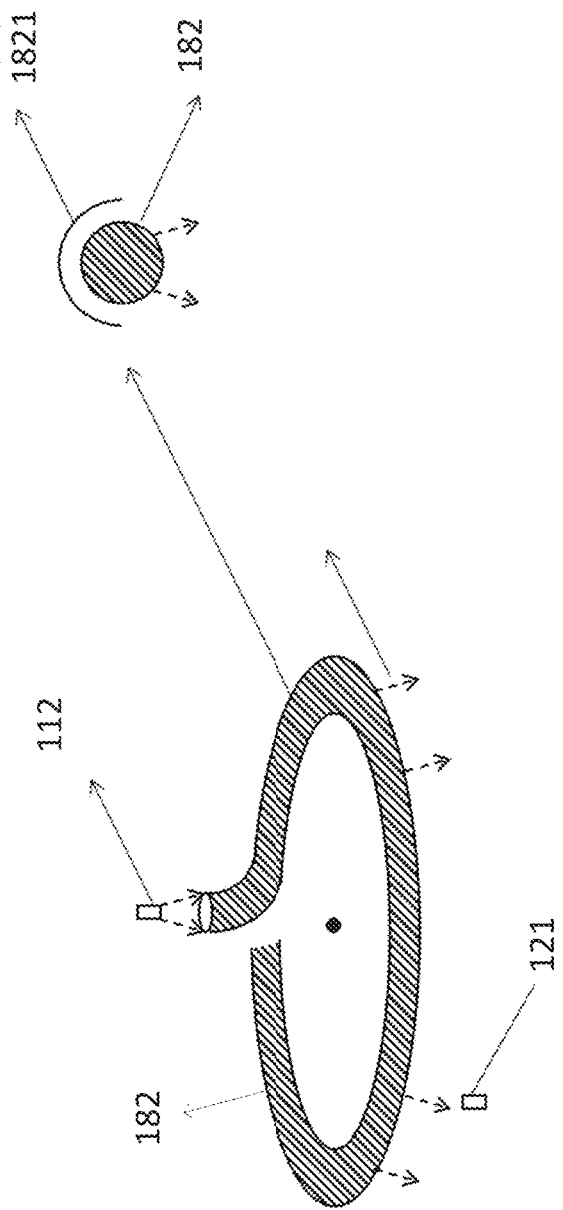

In some other embodiments, the annular lens 181 may be omitted. Referring to FIG. 4d, the coupling optical system 13 of the data transmission apparatus 10 may include a photometric optical fiber 182. The photometric optical fiber 182 is connected to the first emitter 112 and arranged around the central shaft 161. The photometric optical fiber 182 is configured to homogenize the received optical signal emitted by the first emitter 112 so that the optical signal enters the second receiver. Optionally, in some other embodiments, an arc-shaped reflector 1821 may be arranged on a side of the photometric optical fiber 182 away from the second receiver 121. The arc-shaped reflector 1821 may increase light intensity of the photometric optical fiber in a receiving direction so as to ensure energy of a signal beam received by the second receiver 121. Optimally, at least two first emitters 112 may be set, and the two first emitters 112 are respectively and symmetrically arranged on two sides of the central shaft 161, so as to prevent the central shaft 161 from being blocked and hence interrupting the optical signal. Optionally, in some embodiments, a plurality of second receivers may alternatively be set, so as to ensure energy of the signal beam received by the second receiver.

Optionally, as shown in the solution in FIG. 4d, the plurality of first emitters 112 may alternatively be connected to the plurality of photometric optical fibers, and the plurality of photometric optical fibers simultaneously emit to form a uniform optical emitting surface in an annular belt shape.

In the foregoing embodiments, by setting the annular lens or the side-emitting optical fiber in the coupling optical system, transmission quality of the optical signal is greatly improved, and a reception effect of the receiving terminal of the optical signal is improved. The annular lens may effectively converge the optical signal, so that most of the optical signal may be irradiated to the receiving terminal. By setting the side-emitting optical fiber, a diffusion effect of the optical signal is improved, so that the receiving terminal may receive the optical signal in any direction and position, improving a transmission efficiency of the optical signal. Certainly, in some embodiments, the optical coupling system may include 0 to N optical surfaces, where N is a natural number. When the system includes the plurality of first emitters, the plurality of first emitters are arranged at equal spacing and emit the same optical signal, thereby achieving a better coverage effect. The second receiver may effectively receive the optical signal emitted by the first emitter. In this case, the optical coupling system may not be arranged. The data may be transmitted by directly sending the optical signal from the first optical module to the second optical module, thereby simplifying a structure.

In some other embodiments, the data transmission apparatus 10 may also be an on-shaft design in which a coupling optical path is arranged on the central shaft. Relative positions of an emitting surface of the first optical module 11 and a receiving surface of the second optical module 12 do not change significantly when the apparatus 10 rotates.

The data transmission apparatus 10 proposed by the embodiments of the present disclosure is located in the LiDAR system 100. The LiDAR system 100 includes the rotator 151 and the central shaft 161. The data transmission apparatus includes the first optical module 11 and the second optical module 12. The first optical module 11 is configured to receive the first digital signal output by the LiDAR front-end apparatus 20, convert the first digital signal into the optical signal, and send the optical signal to a receiving terminal of the second optical module 12 through an emitting terminal of the first optical module 11. The second optical module 12 receives the optical signal from the first optical module 11 by using the receiving terminal, and converts the optical signal into the first digital signal. The emitting terminal of the first optical module 11 and the receiving terminal of the second optical module 12 are oppositely arranged on the central shaft 161.

In the embodiments of the present disclosure, the emitting terminal of the first optical module and the receiving terminal of the second optical module are oppositely arranged on the central shaft so that when the rotator of the LiDAR and the central shaft rotate relative to each other, the emitting terminal of the first optical module and the receiving terminal of the second optical module do not move relative to each other, but only rotate relative to each other, so as to ensure that the optical signal emitted by the emitting terminal of the first optical module may be directly emitted to the receiving terminal of the second optical module, thereby greatly improving the transmission efficiency of the optical signal. In addition, the structure is very simple.

Referring to FIG. 5a to FIG. 5e, the rotator 15 is the rotator. The rotator further includes a bearing rotor 152. The stator 16 is the central shaft, and the central shaft further includes a bearing stator 162. The bearing stator 162 and the bearing rotor 152 are received in the housing 17. The rotator is connected to the central shaft through a bearing. The rotator is connected to the bearing rotor 152. The central shaft is connected to the bearing stator 162. The emitting terminal of the first optical module is arranged on the bearing rotor 152, and the receiving terminal of the second optical module is arranged on the bearing stator 162. In some optional embodiments, referring to the data transmission apparatus 10 shown in FIG. 5a, the first emitter 112 of the first optical module 11 is connected to a first optical fiber. An emitting terminal 1103 of the first optical fiber is fixedly arranged on the bearing rotor 152. The second receiver 121 of the second optical module 12 is connected to a second optical fiber. A receiving terminal 1203 of the second optical fiber is fixedly arranged on the bearing stator 162. The coupling optical system 13 is arranged between the bearing rotor 152 and the bearing stator 162. The emitting terminal 1103 of the first optical fiber is used as the emitting terminal of the first optical module 11 for emitting the optical signal of the first optical module 11 to the receiving terminal 1203 of the second optical fiber, so that the optical signal is transmitted from the emitting terminal 1103 of the first optical fiber to the receiving terminal 1203 of the second optical fiber, to be received by the second optical module 12. In this embodiment, the emitting terminal of the first optical fiber used as the emitting terminal of the first optical module, and the receiving terminal of the second optical fiber used as the receiving terminal of the second optical module may be arranged from the optical modules in an extending mode. A first modulation circuit of the first optical module and the first emitter of the first optical module may be arranged on the rotator. The first optical fiber used as the emitting terminal of the first optical module is independently arranged in the central shaft. A second modulation circuit of the second optical module and the second receiver of the second optical module may be arranged on a distal end of the fixed central shaft or on a base of the fixed central shaft. The second optical fiber is arranged on the central shaft, and arranged oppositely to the first optical fiber on the central shaft. In this way, only the first optical fiber and the second optical fiber need to be arranged on the central shaft to implement transmission and reception of the optical signal, and the structure is simple.

Similarly, in some other optional embodiments, the first optical module includes the first modulation circuit, configured to modulate the first digital signal output by the LiDAR front-end apparatus into the optical signal; and the first emitter, connected to the first modulation circuit, configured to receive the optical signal output by the first modulation circuit, and used as the emitting terminal of the first optical module for emitting the optical signal to the second optical module. The second optical module includes the second receiver, used as the receiving terminal of the second optical module for receiving the optical signal, and outputting the optical signal; and the second demodulation circuit, connected to the second receiver, and configured to demodulate the optical signal output by the second receiver into the first digital signal and output the first digital signal to the upper application apparatus. In this embodiment, the modulation circuit and the emitter may be separated by arranging the first emitter of the first optical module and the second receiver of the second optical module on the central shaft. For example, the first modulation circuit may be separated from the first emitter in an extending mode. The first modulation circuit is arranged on the rotator. The first emitter is arranged on the foregoing bearing rotor 152. Similarly, the second modulation circuit is arranged on the base of the central shaft in an extending mode. The second receiver is arranged on the bearing stator 162. This greatly saves a space occupied by the first emitter and the second receiver on the central shaft and simplifies difficulty of arrangement.

It may be understood that the data transmission apparatus 10 further includes a first communication interface 141 and a second communication interface 142. The first communication interface 141 is connected to the first optical module 11 and the LiDAR front-end apparatus 20 for communication between the first optical module 11 and the LiDAR front-end apparatus 20. The second communication port is connected to the second optical module 12 and the upper application apparatus 30 for communication between the second optical module 12 and the upper application apparatus 30.

Figure 5B:
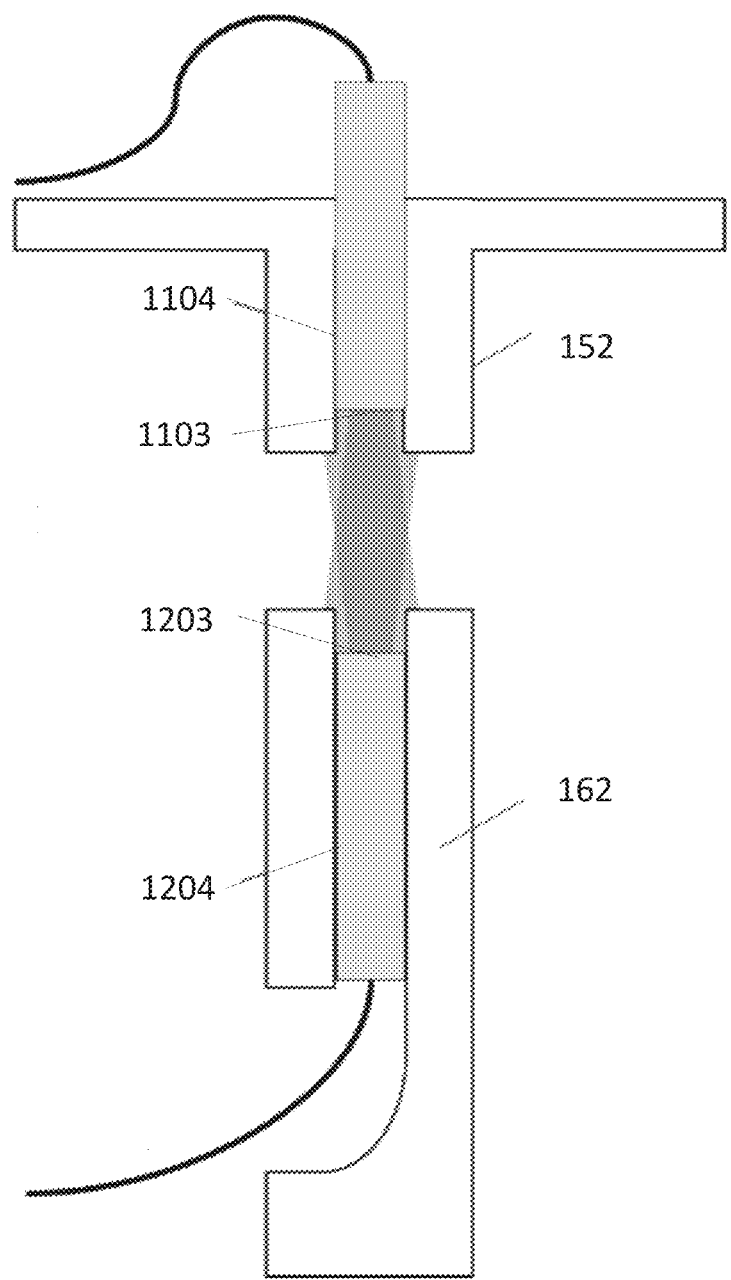

In some optional embodiments, referring to the data transmission apparatus shown in FIG. 5b, the emitting terminal 1103 of the first optical fiber is fixed to the bearing rotor 152 through a first optical fiber connector 1104. The receiving terminal 1203 of the second optical fiber is fixed to the bearing stator 162 through a second optical fiber connector 1204. After an optical signal emitted by the first optical fiber connector 1104 propagates a distance according to an inherent angle of the optical signal, a part of the optical signal is irradiated on the second optical fiber connector 1204 to be received by the second optical module 12.

In some optional embodiments, the coupling optical system 13 between the first emitting terminal and the second receiving terminal may include a series of optical surfaces to assist optical coupling between the emitting terminal and the receiving terminal. Optical fibers being the emitting terminal and the receiving terminal is used as an example for description below.

Figure 5C:
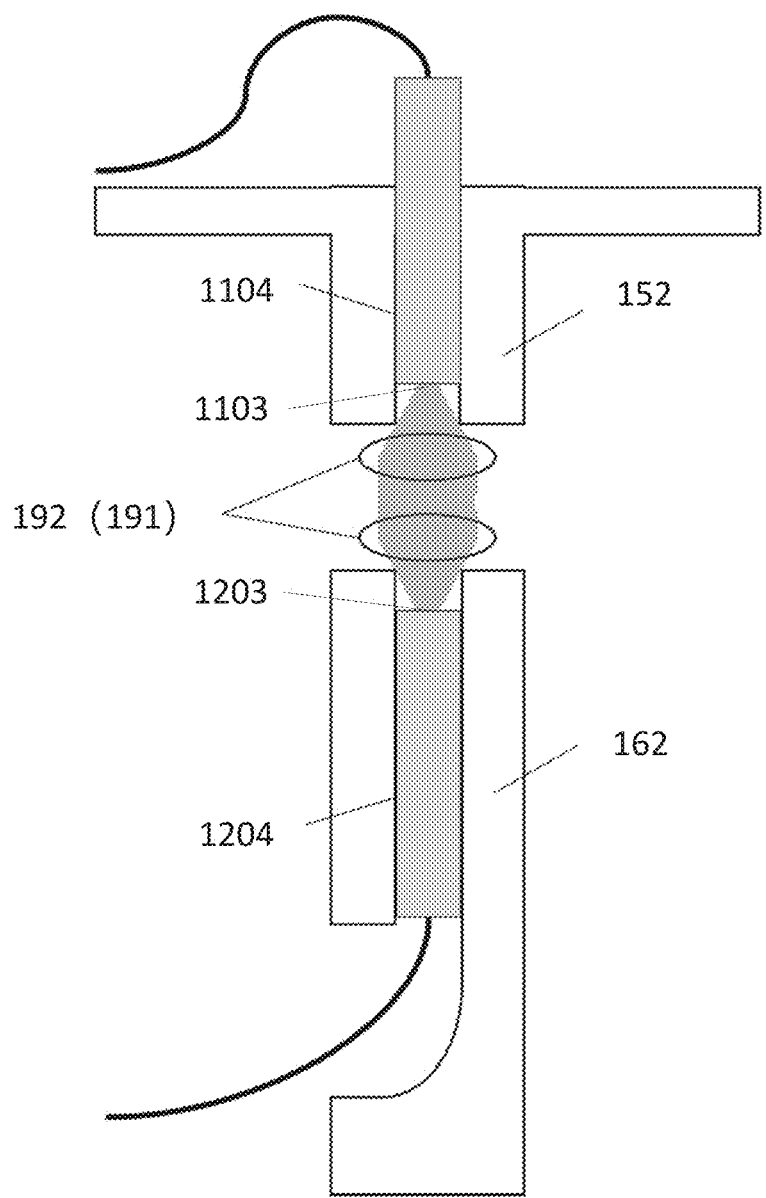
Figure 5D:
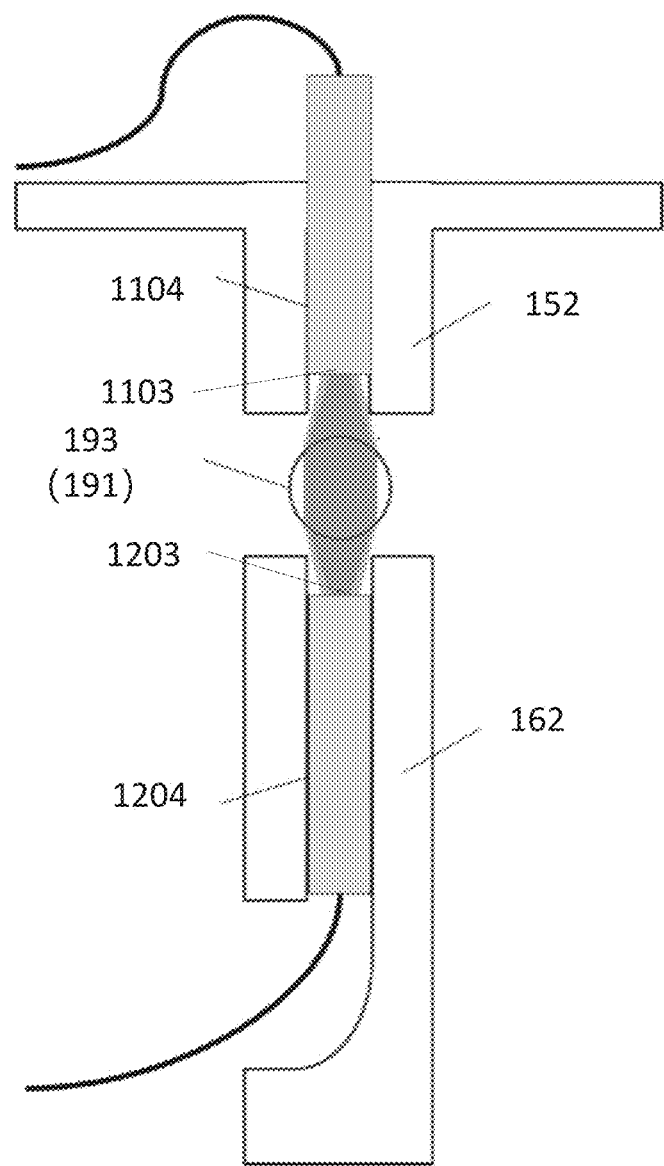

In some embodiments, there may be 0 to N optical surfaces, as shown in FIG. 5c and FIG. 5d. The coupling optical system 13 of the data transmission apparatus 10 may include an optical lens group 191. The optical lens group 191 is configured to couple, to the receiving terminal 1203 of the second optical fiber, the optical signal emitted by the emitting terminal 1103 of the first optical fiber. The optical surface is arranged between the emitting terminal 1103 of the first optical fiber and the receiving terminal 1203 of the second optical fiber, to increase a receiving rate of the optical signal of the receiving terminal 1203 of the second optical fiber.

Optionally, in some embodiments, as shown in FIG. 5c, the optical lens group 191 in the coupling optical system 13 may be a collimating lens group 192. The collimating lens group 192 is configured to change the optical signal emitted by the emitting terminal 1103 of the first optical fiber into a collimated optical signal, and converge the collimated optical signal to the receiving terminal 1203 of the second optical fiber. Specifically, the collimating lens group 192 includes two collimating lenses, and the collimating lens close to the emitting terminal 1103 of the first optical fiber is configured to change a diffused optical signal emitted by the emitting terminal 1103 of the first optical fiber into the collimated optical signal. The collimating lens away from the emitting terminal 1103 of the first optical fiber is configured to converge the collimated optical signal to the receiving terminal 1203 of the second optical fiber.

Optionally, in some embodiments, as shown in FIG. 5d, the optical lens group 191 in the coupling optical system 13 may alternatively be a spherical lens 193. The spherical lens 193 is configured to converge the optical signal emitted by the emitting terminal 1103 of the first optical fiber to the receiving terminal 1203 of the second optical fiber.

It should be noted that there may be a plurality of first emitters and first optical fibers, and there may also be a plurality of second receivers and second optical fibers, provided that the receiving terminal 1203 of the second optical fiber may receive the optical signal emitted by the emitting terminal 1103 of the first optical fiber.

Figure 5E:
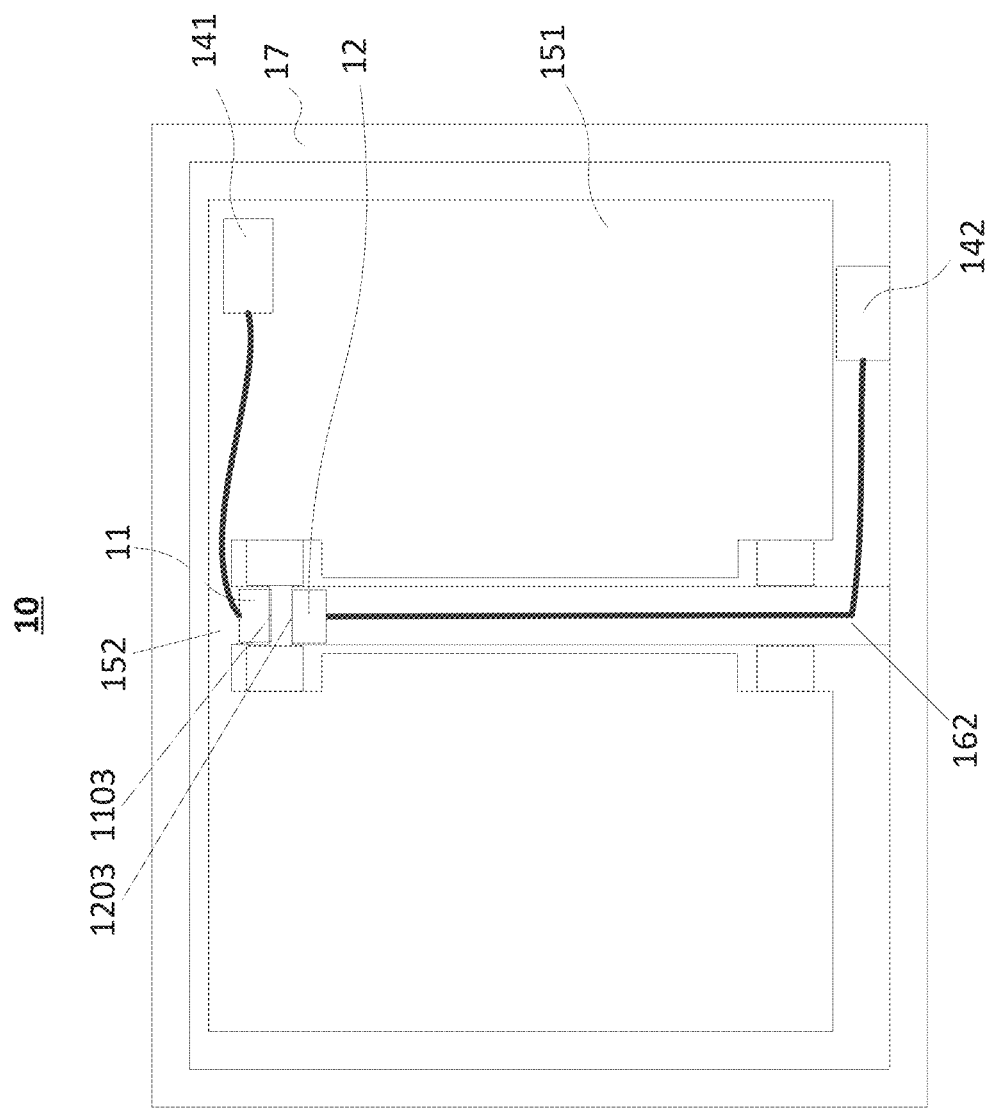

In other optional embodiments, please refer to the data transmission apparatus shown in FIG. 5*e*, the first emitter of the first optical module 11 is fixed on the bearing rotor, and the second receiver of the optical module 12 is fixed on the bearing stator. A series of optical surfaces may be inserted between beam emitting/receiving surfaces of the first optical module and the second optical module to assist optical coupling between the first optical module and the second optical module, and the number of the optical surfaces may be 0 to N. Therefore, the reception of the optical signal by the second optical module is improved.

It should be noted that the data transmission apparatus may also transmit an uplink signal at the same time. In the embodiment of the out-of-shaft data transmission apparatus shown in FIG. 4*a*, if the first optical module 11 and the second optical module 12 in an out-of-shaft solution need to transmit uplink data and downlink data at the same time, the first emitter 112 of the first optical module 11 and a second emitter 124 of the second optical module 12 may be placed in a staggered manner, thereby avoiding interference between optical paths. In addition, because the optical path is reversible, the same coupling optical system may be shared at the same time to transmit the downlink signal and the uplink signal. It may be understood that the coupling optical system is shown in FIG. 4*b*, FIG. 4*c*, and FIG. 4*d*.

It may be understood that in the embodiment of the on-shaft data transmission apparatus shown in FIG. 5*a*, if the first optical module 11 and the second optical module 12 in an on-shaft solution transmit the uplink data and the downlink data simultaneously, the data transmission apparatus in the on-shaft solution further includes a third optical fiber and a fourth optical fiber. The second emitter 124 is connected to the third optical fiber, and the first receiver 113 is connected to the fourth optical fiber. An emitting terminal of the third optical fiber is fixed on the bearing stator 162, and a receiving terminal of the fourth optical fiber is fixed on the bearing rotor 152. The emitting terminal of the third optical fiber is configured to emit the optical signal of the second optical module 12 to the receiving terminal of the fourth optical fiber, so that the optical signal converted from the uplink data is transmitted from the emitting terminal of the third optical fiber to the receiving terminal of the fourth optical fiber, so as to be received by the first optical module. It may be understood that, to ensure that optical paths are not interfered with, the emitting terminal of the first optical fiber and the emitting terminal of the third optical fiber may be arranged in a staggered manner. In addition, because the optical path is reversible, the coupling optical system 13 may be those shown in FIG. 5*b*, FIG. 5*c*, and FIG. 5*d*.

It may be understood that, in the data transmission apparatus shown in FIG. 5*e*, the first optical module is fixed on the bearing rotor, and the second optical module is fixed on the bearing stator. It may be understood that, to ensure that optical paths are not interfered with, the first emitter of the first optical module and the second emitter of the second optical module may be arranged in a staggered manner. In addition, because the optical path is reversible, the coupling optical system 13 of this embodiment is the same as that of the embodiment of FIG. 5*e*.

The data transmission apparatus 10 in the embodiments of the present disclosure receives, by using the first optical module 11, the first digital signal output by the LiDAR front-end apparatus 20, converts the first digital signal into the optical signal, and sends the optical signal to the receiving terminal of the second optical module through the emitting terminal of the first optical module. The second optical module receives the optical signal from the first optical module by using the receiving terminal, and converts the optical signal into a first digital signal. The emitting terminal of the first optical module and the receiving terminal of the second optical module are oppositely arranged on the central shaft. It may be seen that in this embodiment, light is used as a data transmission medium for data transmission. Transmission efficiency of the optical signal is greatly improved, and the structure is simplified by coaxially arranging the emitting terminal and the receiving terminal. In addition, because of the large communication capacity, the great anti-electromagnetic interference performance, and the great transmission quality of the optical communication, the data transmission efficiency may be improved.

In some embodiments, only uplink data transmission is used as an example.

Please refer to FIG. 2 again, FIG. 2 shows a schematic structural diagram of a data transmission apparatus according to an embodiment of the present disclosure. As shown in FIG. 2, the data transmission apparatus 10 includes a first optical module 11 and a second optical module 12.

The second optical module is configured to receive a second digital signal output by an upper application apparatus, convert the second digital signal into an optical signal, and send the optical signal to a receiving terminal of the first optical module through an emitting terminal of the second optical module. The first optical module receives the optical signal from the second optical module by using the receiving terminal, and converts the optical signal into the second digital signal. The emitting terminal of the second optical module and the receiving terminal of the first optical module are oppositely arranged on a central shaft.

Specifically, referring to FIG. 3 again, the first optical module 11 further includes a first receiver 113 and a first demodulation circuit 114. One end of the first demodulation circuit 114 is connected to the first receiver 113, and the other end of the first demodulation circuit 114 is connected to a LiDAR front-end apparatus 20. The second optical module 12 further includes a second modulation circuit 123 and a second emitter 124. One end of the second modulation circuit 123 is connected to the upper application apparatus 30, and the other end of the second modulation circuit 123 is connected to the second emitter 124. In this embodiment, the second modulation circuit 123 is configured to receive the second digital signal sent by the upper application apparatus 30 and modulate the second digital signal into the optical signal. The second emitter 124 is configured to emit, to a coupling optical system 13, the optical signal output by the second modulation circuit 123. The coupling optical system 13 transmits the optical signal to the first receiver 113. The first receiver 113 is configured to receive the optical signal transmitted by the coupling optical system 13. The first demodulation circuit 114 is configured to demodulate the optical signal into the second digital signal and output the second digital signal to the LiDAR front-end apparatus 20. The LiDAR front-end apparatus 20 processes the received second digital signal to obtain control instruction information from the upper application apparatus 30.

It may be understood that the data transmission apparatus is located in a LiDAR system. The LiDAR system includes a rotor (15) and a stator (16). The first optical module is arranged on the rotor (15), and the second optical module is arranged on the stator (16).

It may be understood that an implementation of uplink data transmission includes an out-of-shaft type (as shown in FIG. 4a) and an on-shaft type (as shown in FIGS. 5a and 5e).

Because the optical path is reversible, the coupling optical system is arranged the same as the data transmission apparatus for downlink data transmission. Refer to FIG. 4b, FIG. 4c, and FIG. 4d for the out-of-shaft type. Refer to FIG. 5b, FIG. 5c, and FIG. 5d for the on-shaft type. Details are not repeated herein.

Figure 6:
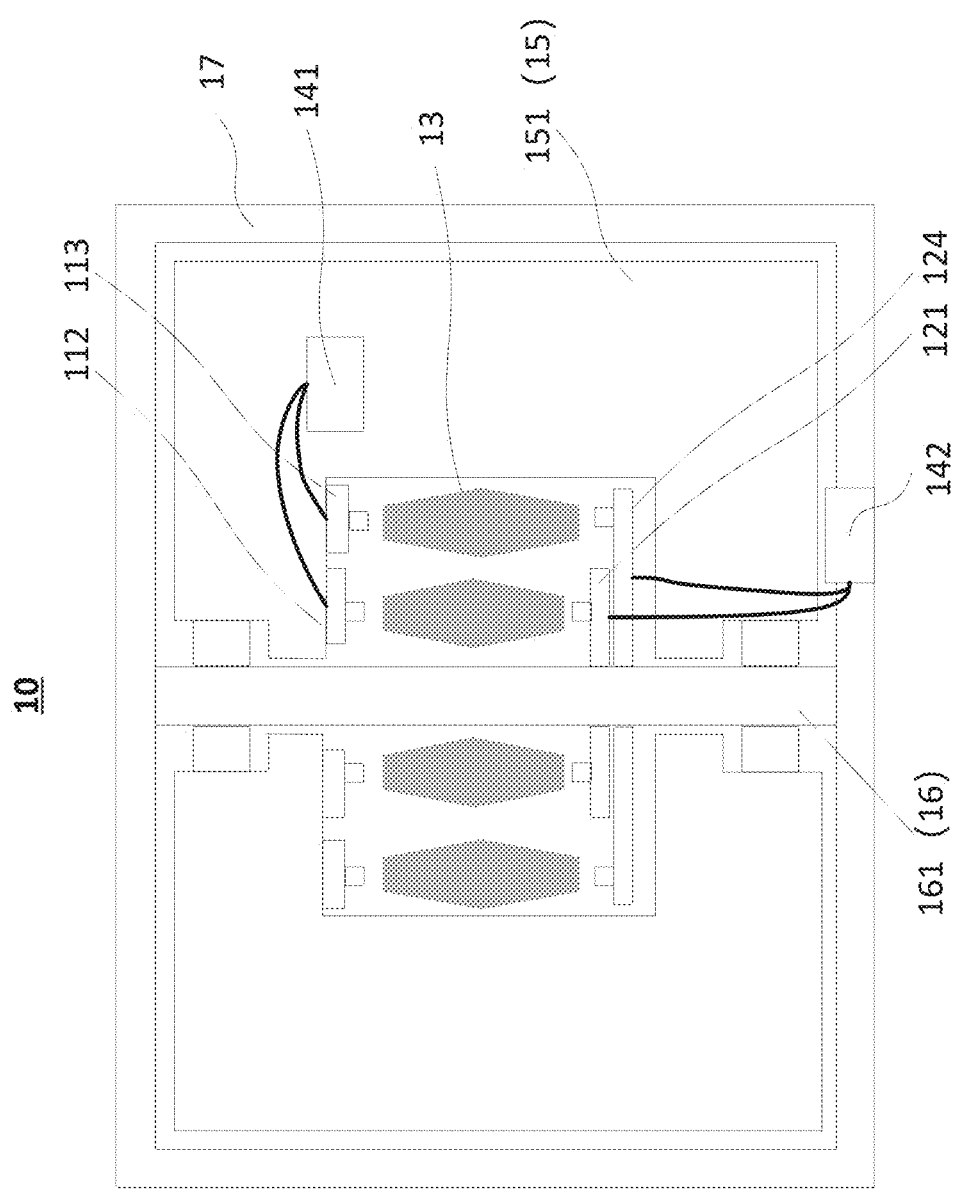
FIG. 6 shows a schematic structural diagram of a data transmission apparatus provided by another embodiment of the present disclosure.

In some optional embodiments, it may be understood that the same data transmission apparatus may be selected for the uplink data transmission and the downlink data transmission, as shown in FIG. 6. It may be understood that alternatively, separate data transmission apparatuses may be used for the uplink data transmission and the downlink data transmission. It may be understood that when separate data transmission apparatuses are used for the uplink data transmission and the downlink data transmission, the two data transmission apparatuses may be the same. For example, the on-shaft solution may be used for both, and the same solution is also selected for coupling optical systems. Optionally, the two data transmission apparatuses may alternatively be different. For example, the out-of-shaft solution is selected for the uplink data transmission, and the on-shaft solution is used for the downlink signal transmission. Alternatively, the on-shaft solution is selected for the uplink data transmission, and the out-of-shaft solution is selected for the downlink data transmission. For another example, the two data transmission apparatuses may both select the out-of-shaft solution, but use different coupling optical systems. It may be understood that when two different data transmission apparatuses are used, interference during simultaneous transmission of uplink data and downlink data may be more effectively avoided.

Figure 7:
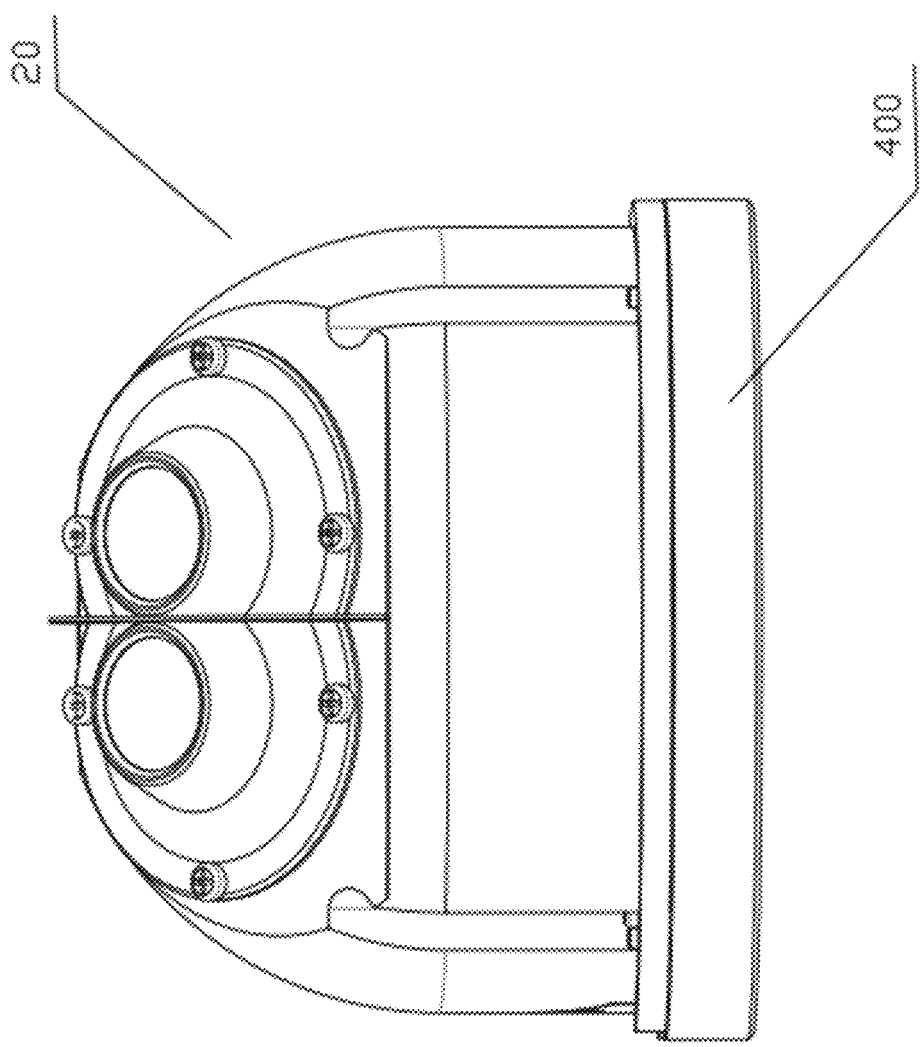
FIG. 7 shows a LiDAR provided by another embodiment of the present disclosure.
Figure 8A:
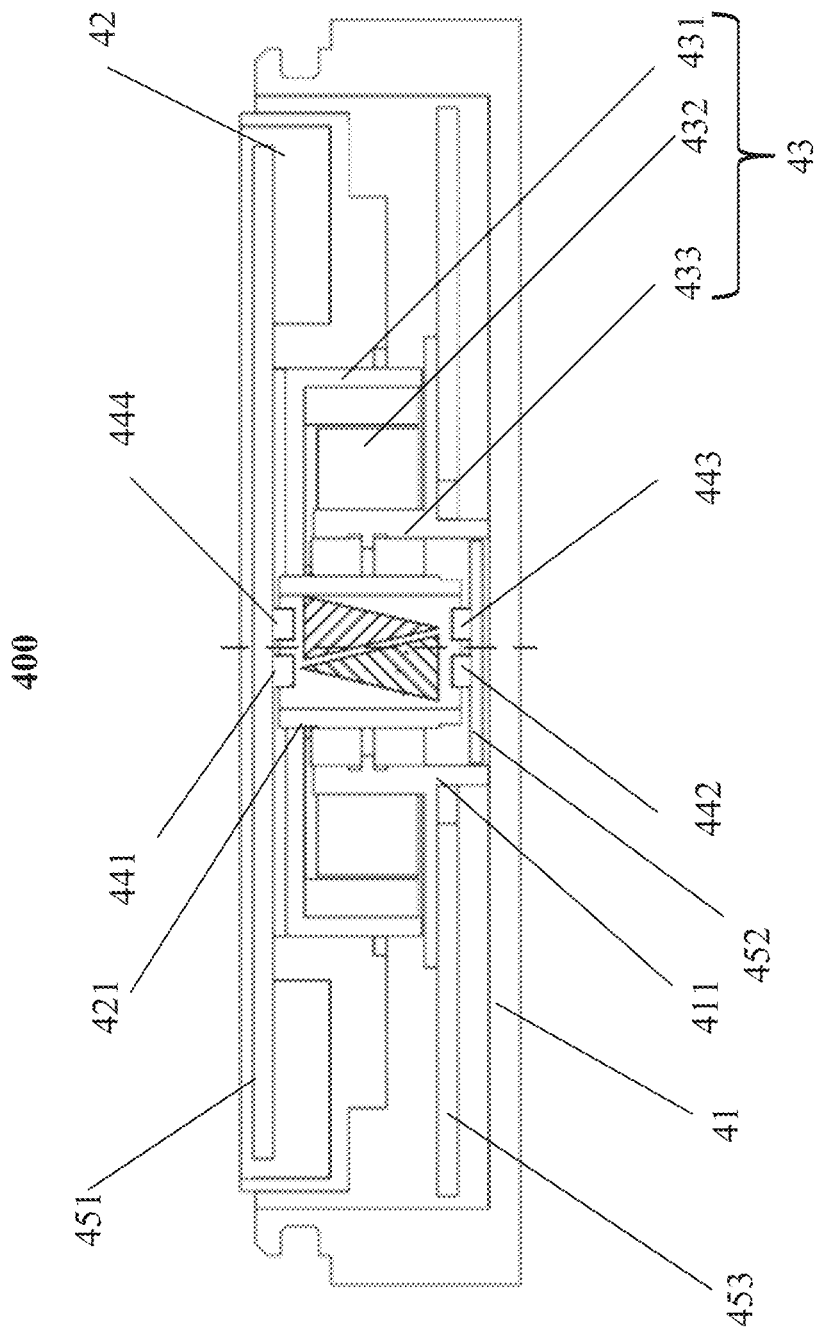
FIG. 8a shows a schematic structural diagram of a data transmission apparatus provided by another embodiment of the present disclosure.
Figure 8B:
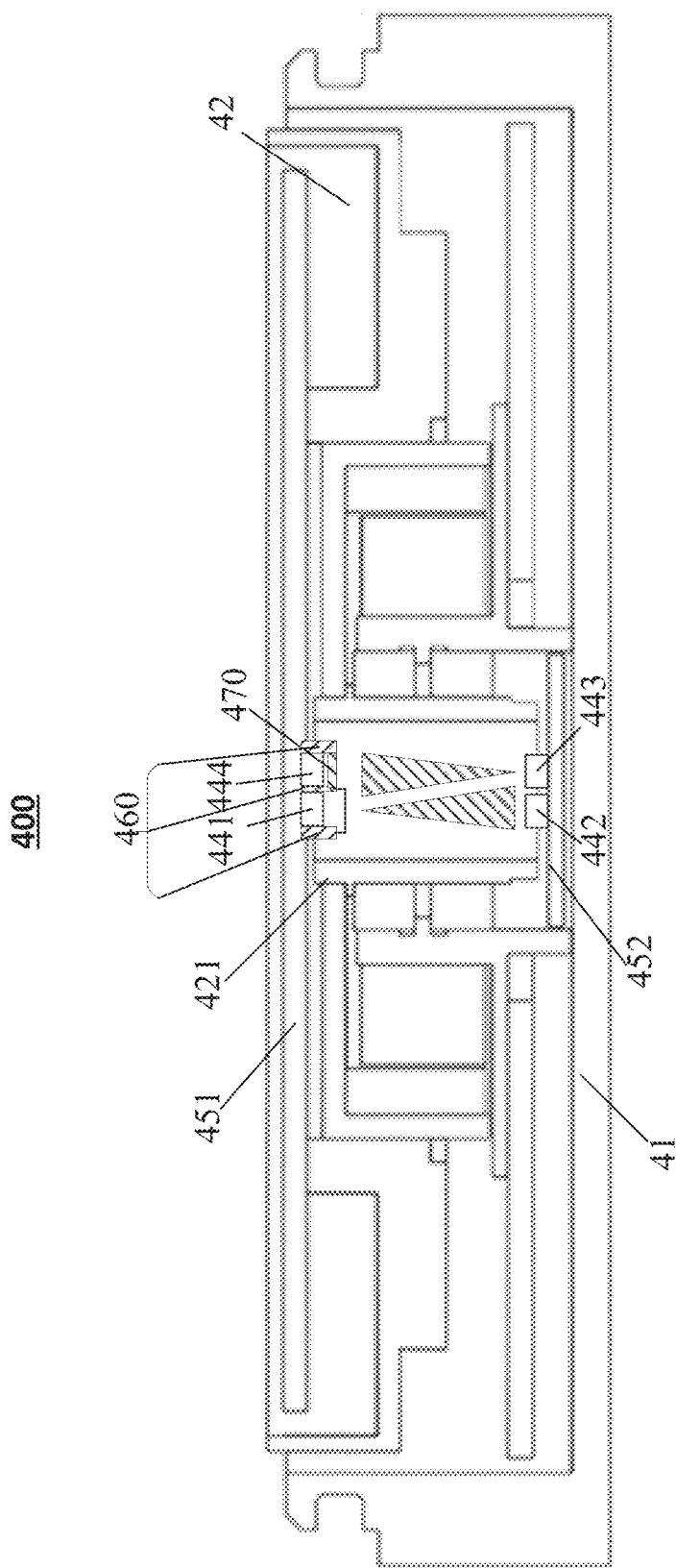
FIG. 8b shows a schematic structural diagram of a data transmission apparatus provided by another embodiment of the present disclosure.

On the basis of the foregoing embodiments of the present disclosure, another embodiment of the present disclosure provides a LiDAR. The LiDAR includes: a LiDAR front-end apparatus configured to emit an emitted laser and receive a reflected laser, and the reflected laser is a laser, reflected back by an object in a detection area, of the emitted laser; and a rotating system arranged on one side of a laser transceiver system and detachably connected to the laser transceiver system, where the rotating system is configured to drive the LiDAR front-end apparatus to rotate to change a path of the emitted laser. For example, as shown in FIG. 7, the LiDAR includes the LiDAR front-end apparatus 20 and the rotating system 400. The LiDAR front-end apparatus 20 is arranged at an upper end of the rotating system 400. The LiDAR front-end apparatus 20 includes a laser emitting lens, a laser emitting board, a laser receiving lens, and a laser receiving board. The rotating system 400, as shown in FIGS. 8a and 8b, includes a fixing base 41 and a rotator 42. The LiDAR front-end apparatus 20 is fixed on an upper part of the rotator 42. The rotator 42 drives the LiDAR front-end apparatus 20 to rotate. The LiDAR front-end apparatus 20 is configured to receive light information reflected by a target object and convert the light information into a first digital signal. A data transmission apparatus is fixed inside the rotating system 400 and configured to transmit the first digital signal to an upper application apparatus. In addition, the upper application apparatus is configured to convert control information into a second digital signal. The data transmission apparatus is further configured to transmit the second digital signal to the LiDAR front-end apparatus 20.

As shown in FIGS. 8a and 8b, the data transmission apparatus is provided by the embodiment of the present disclosure. The rotating system 400 includes the fixing base 41 and the rotator 42. The rotator 42 and the fixing base 41 relatively rotate around a central axis of the rotator 42. The rotator 42 and the fixing base 41 form a hollow structure at the central axis together.

Preferably, a central shaft 411 is arranged on the fixing base 41. The rotator 42 is rotationally connected to the fixing base 41 and rotates around a central axis of the central shaft 411. The rotator 42 and the central shaft 411 define a hollow structure together. A first optical module 441 and a second optical module 442 are both arranged in the hollow structure. The first optical module 441 is arranged on the rotator 42. The second optical module 442 is arranged on the fixing base 41. Further, the rotator 42 also includes a rotating shaft 421. A central axis of the rotating shaft 421 coincides with the central axis of the central shaft 411. The rotating shaft 421 is arranged in the hollow structure and rotationally connected to an inner peripheral wall of the central shaft 411.

In the above manner, the rotating shaft and the central shaft are arranged on the rotator and the fixing base, respectively, the hollow structure is formed at the central axis of the rotator and the fixing base, and the first optical module and the second optical module are arranged in the hollow structure, thereby avoiding blocking caused during an optical transmission process, and improving a transmission efficiency of an optical signal.

As shown in FIG. 8a, in this embodiment of the present disclosure, a drive apparatus, such as a motor 43, is further included. The motor 43 is used as an example below for description.

The motor 43 is arranged in the hollow structure, and the rotator 42 is rotationally connected to the fixing base 41 through the motor 43. The motor 43 is also provided with a hollow structure. When the rotator 42 is connected to the fixing base 41 through the motor 43, the rotator 42, the fixing base 41, and the motor 43 also form a hollow structure at the central axis of the rotator 42. The motor 43 includes a stator 432, a rotor 431 coupled to the stator 432, and a bearing 433. The motor 43 is an outer rotor motor. The rotor 431 is sleeved on the stator 432 so that the rotor 431 wraps the stator 432 and the bearing 433. The stator 432 is sleeved on an outer peripheral wall of the central shaft 411. The rotor 431 is arranged around the stator 432, and the rotor 431 is connected to the rotator 42. The bearing 433 is located between the central shaft 411 and the rotating shaft 421 to drive the rotator 42 to rotate relative to the fixing base 41.

It may be seen from the foregoing description that for the data transmission apparatus provided by this embodiment of the present disclosure, the first optical module and the second optical module are arranged in the hollow structure defined by the rotator and the central shaft, thereby avoiding blocking caused during the optical transmission process, and improving the transmission efficiency of the optical signal.

To implement data transmission of the LiDAR, the rotating system 400 provided by this embodiment of the present disclosure is provided with a first optical module 441, a second optical module 442, a third optical module 443, and a fourth optical module 444 in the hollow structure, to perform uplink data transmission and downlink data transmission simultaneously. As shown in FIG. 8a, the first optical module 441 and the fourth optical module 444 are arranged on the rotator 42. The second optical module 442 and the third optical module 443 are arranged on the fixing base 41. The first optical module 441 and the second optical module 442 are arranged oppositely in the hollow structure. The third optical module 443 and the fourth optical module 444 are arranged oppositely in the hollow structure. The first optical module 441 is configured to receive the first digital signal output by the LiDAR front-end apparatus 20 and convert the first digital signal into an optical signal. The second optical module 442 is configured to convert the optical signal into the first digital signal and output the first digital signal to the upper application apparatus. The third optical module 443 is configured to receive the second digital signal output by the upper application apparatus, and convert the second digital signal into an optical signal. The fourth optical module 444 is further configured to convert the optical signal into the second digital signal and output the second digital signal to the LiDAR front-end apparatus 20.

In this embodiment of the present disclosure, the plurality of optical modules are arranged in the hollow structure formed by the rotator and the fixing base to perform uplink data transmission and downlink data transmission, thereby avoiding mutual interference during simultaneous transmission of the uplink data and the downlink data, and improving transmission reliability of the optical signal.

Further, to improve the transmission efficiency of the optical signal, in some other embodiments of the present disclosure, the plurality of optical modules are divided into different optical signal transmission channels. It may be understood that, to avoid interference between optical signals in different channels, the optical signals with different wavelengths may be transmitted in the different optical signal transmission channels. For example, in the optical signal transmission channel formed by the first optical module and the second optical module, a wavelength of emitted light is $\lambda 1$, and in the optical signal transmission channel formed by the third optical module and the fourth optical module, a wavelength of emitted light is $\lambda 2$.

Further, to further prevent a problem of crosstalk of the optical signals between the different optical signal transmission channels, in other embodiments of the present disclosure, the data transmission apparatus further includes a filter structure, as shown in FIG. 8b. The filter structure includes: a light blocking structure 460, which is arranged between the first optical module 441 and the fourth optical module 444, and between a connecting side of a first circuit board 451 and each of the first optical module 441 and the fourth optical module 444, and an optical filter 470 in front of a receiving terminal of the fourth optical module 444.

It may be understood that when the data transmission apparatus includes the two optical signal transmission channels, a filter structure may be arranged on any channel to further prevent the problem of crosstalk between the different optical signal transmission channels.

For example, the filter structure may also be arranged on the second optical module 442 and the third optical module 443. It may be understood that when the filter structure is arranged on the second optical module 442 and the third optical module 443, the light blocking structure 460 is arranged between the second optical module 442 and the third optical module 443, and between a connecting side of a second circuit board and each of the second optical module 442 and the third optical module 443. The optical filter 470 is arranged in front of a receiving terminal of the second optical module.

Figure 9:
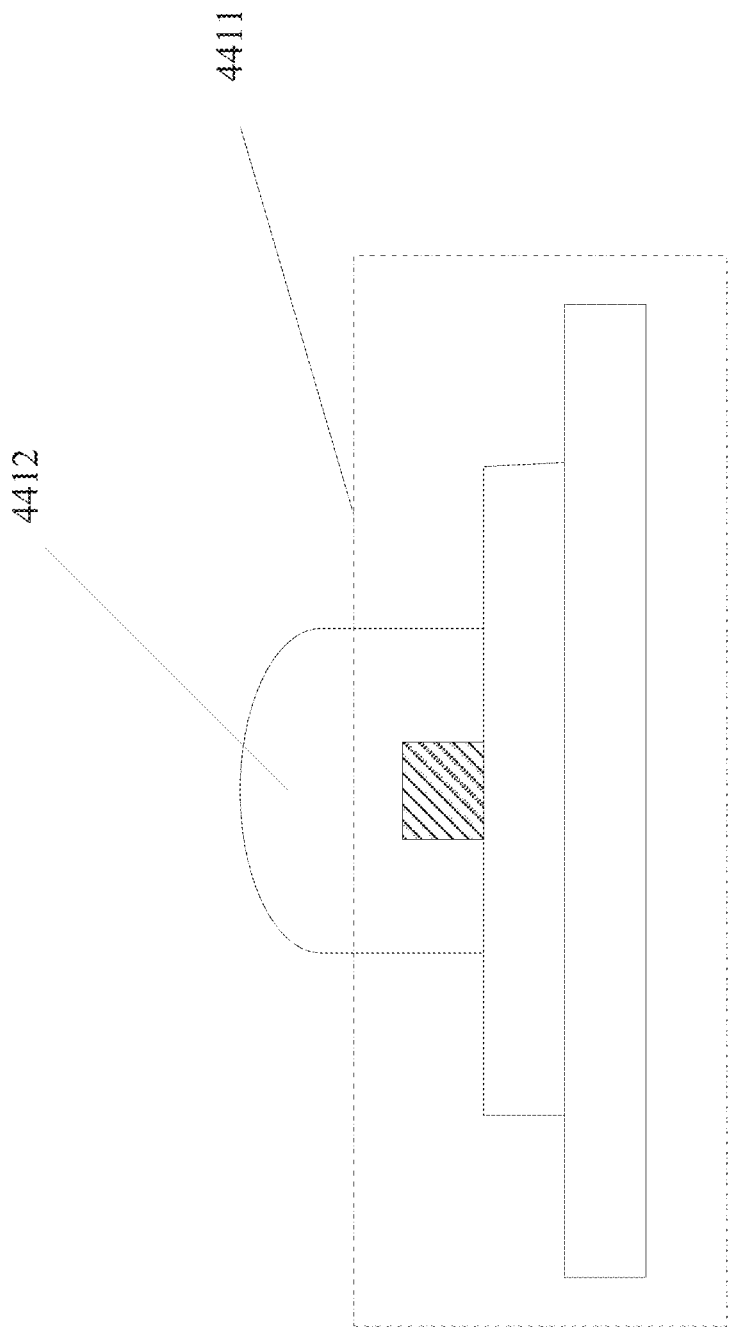
FIG. 9 shows a structural diagram of packaging an optical module and a coupling optical system provided by another embodiment of the present disclosure.

Further, to improve the transmission efficiency of the optical signal, a coupling optical system is provided in this embodiment of the present disclosure. The coupling optical system is configured to adjust the optical signal output by the first optical module 441 and then send the optical signal to the second optical module 442, and is further configured to adjust the optical signal output by the third optical module 443 and send the optical signal to the fourth optical module 444. The coupling optical system consists of one or more optical elements that have 0 to N optical surfaces, and is configured to homogenize or converge the received optical signal. It may be understood that the coupling optical system may be packaged with an optical module (as shown in FIG. 9) or may be independently arranged in the hollow structure. It may be understood that the coupling optical system may alternatively include a part packaged with an optical module and a part independently arranged in the hollow structure. It may be understood that when the coupling optical system and the optical module are packaged together, the coupling optical system may include a homogenization module or a collimating module. The homogenization module may be, for example, a homogenizing sheet, a homogenization lens, or a photometric optical fiber, and the collimating module includes one or more optical lenses.

Further, the first circuit board 451 is arranged on the rotator 42. The first optical module 441 and the fourth optical module 444 are arranged at a position on the circuit board 451 opposite to the hollow structure. The second circuit board 452 is arranged on the fixing base 41. The second optical module 442 and the third optical module 443 are arranged at a position on the second circuit board 452 opposite to the hollow structure. A third circuit board 453 is further arranged on the rotator 42. The third circuit board 453 is a hardware baseboard. In this embodiment of the present disclosure, the optical module and the circuit board are directly fixed together, so that a layout of an optical communication module is more compact, assembly complexity is reduced, and reliability is improved.

In addition, to better implement simultaneous transmission of the uplink data and the downlink data and avoid transmission interference, the first optical module 441 and the third optical module 443 select different transmission wavelengths to send the optical signal.

Furthermore, an embodiment of the present disclosure proposes a method for arranging an optical module in a data transmission apparatus to improve transmission reliability of an optical signal of the data transmission apparatus. As shown in FIG. 8a, in this embodiment of the present disclosure, a first optical module 441 and a fourth optical module 444 are respectively arranged on two sides of a rotator relative to a central axis of a hollow structure. A second optical module 442 and a third optical module 443 are respectively arranged on two sides of the fixing base relative to the central axis of the hollow structure. The second optical module 442 is located in a light spot formed on the fixing base when the first optical module 441 sends the optical signal. The fourth optical module 444 is located in a light spot formed on the rotator when the third optical module 443 sends the optical signal. In this embodiment of the present disclosure, when the rotator rotates relative to the fixing base, a receiving terminal is always located within a light spot range of an emitting optical module. Due to the hollow structure, no optical signal blind region is generated during rotation, thereby avoiding interruption of a transmitted signal and simplifying a structure of the data transmission apparatus while ensuring data transmission quality. Further, to improve the transmission efficiency of the optical signal, the coupling optical system is further provided in this embodiment of the present disclosure. The coupling optical system includes a first homogenization module and a second homogenization module. For example, the first optical module and the first homogenization module are packaged together to homogenize the optical signal emitted by the first optical module. The third optical module and the second homogenization module are packaged together. Arranging the coupling optical system expands a light spot range of an emitting module, thereby making an emitted optical signal more uniform, and increasing data transmission stability. In addition, as shown in FIG. 9, an optical module 4411 and a coupling optical system 4412 are packaged together, thereby increasing compactness of the system and improving reliability of the system. The homogenization module may be a homogenizing sheet, a homogenization lens, or a photometric optical fiber. A homogenization lens group may include one or more optical lenses. It may be understood that the first homogenization module and the second homogenization module may use the same structure or different structures. For example, the first homogenization module may be a homogenizing sheet or the homogenization lens group, and the second homogenization module may be a photometric optical fiber.

Figure 10:
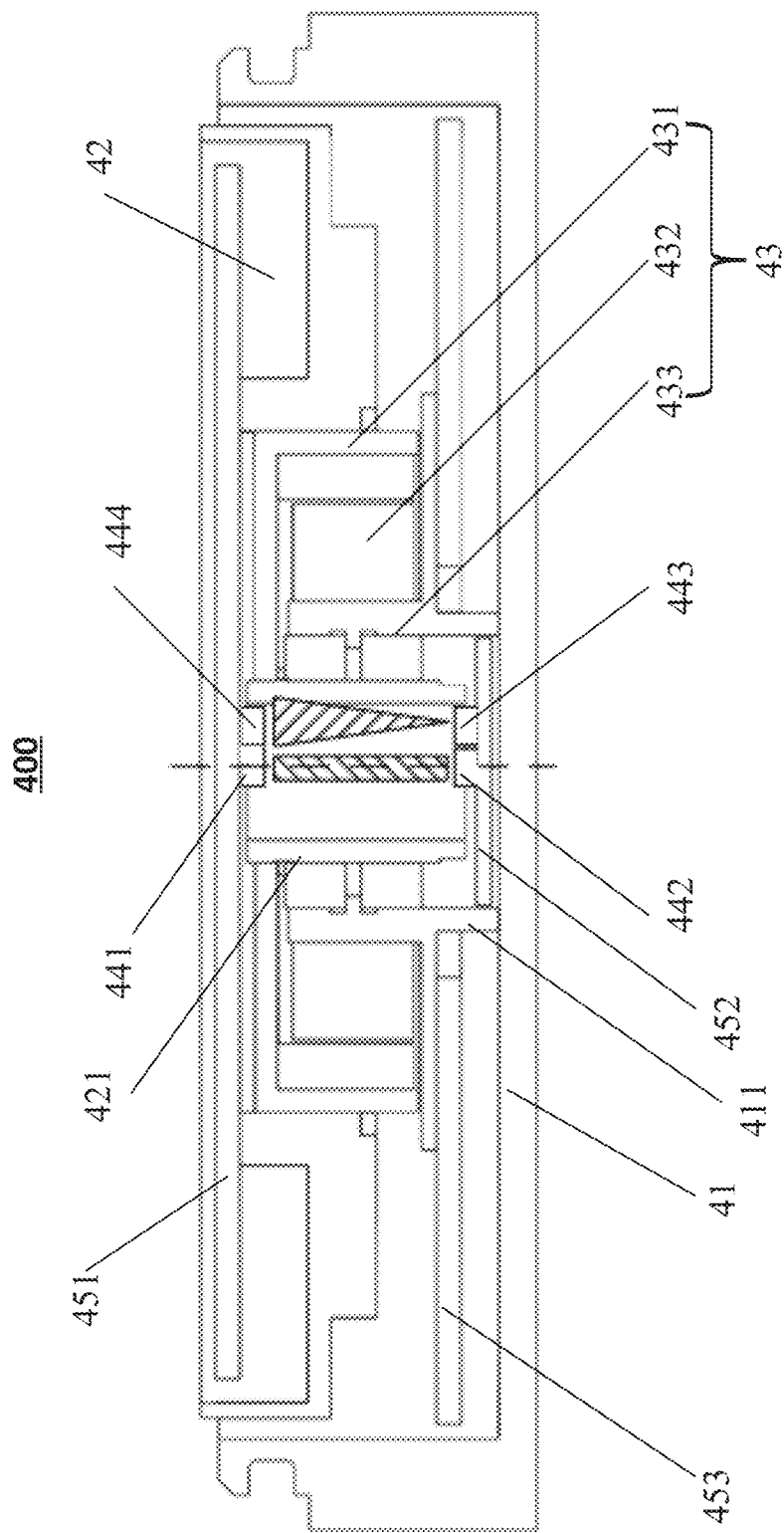
FIG. 10 shows an optical path diagram of a data transmission apparatus provided by another embodiment of the present disclosure.

In another optional embodiment, the present disclosure also proposes another method for arranging an optical module in a data transmission apparatus, as shown in FIG. 10. Because in an actual application of a LiDAR, downlink data are ranging data, and an amount of the data is often relatively large, while uplink data are mainly control data, and configured to control a LiDAR front-end apparatus, and an amount of the data is relatively small. To improve a transmission efficiency of the downlink data, the coupling optical system is arranged as a first collimating module and a third homogenization module. The first collimating module includes one or more optical lenses. The third homogenization module may be a homogenizing sheet, a homogenization lens group, or a photometric optical fiber. The first collimating module includes one or more optical lenses. In this embodiment of the present disclosure, a first optical module 441 and the first collimating module are packaged together. For example, as shown in FIG. 9, the optical module 4411 and the coupling optical system 4412 are packaged together for a more compact structure, so as to collimate an optical signal emitted by the first optical module. In addition, the first optical module 441 is arranged at a position at which a central axis of the hollow structure intersects with a rotator. A second optical module 442 is arranged at a position at which the central axis of the hollow structure intersects with the fixing base, so that the first optical module 441 and the second optical module 442 are located on a central axis of the rotator 42. When the rotator 42 and the fixing shaft 41 rotate relative to each other, the first optical module 441 and the second optical module 442 may directly face each other without a position shift. In addition, the first optical module 441 sends parallel light parallel to the central axis of the hollow structure to the second optical module 442 through a collimating system. In this case, transmission efficiency of an optical signal emitted by the first optical module 441 is maximum. In addition, to ensure uplink signal transmission, a third optical module 443 and the third homogenization module are packaged together to homogenize the optical signal emitted by the third optical module 443. The third optical module 443 is arranged on the fixing base on a side relative to the central axis of the hollow structure. A fourth optical module 444 is arranged on the rotator on a side relative to the central axis of the hollow structure. An optical signal sent by the third optical module 443 is homogenized and then emitted to the fourth optical module 444. The fourth optical module is located in a light spot formed on the rotator when the third optical module 443 sends the optical signal. In this way, transmission efficiency of the downlink data is ensured first. In addition, uplink data transmission is not affected.

Figure 11:
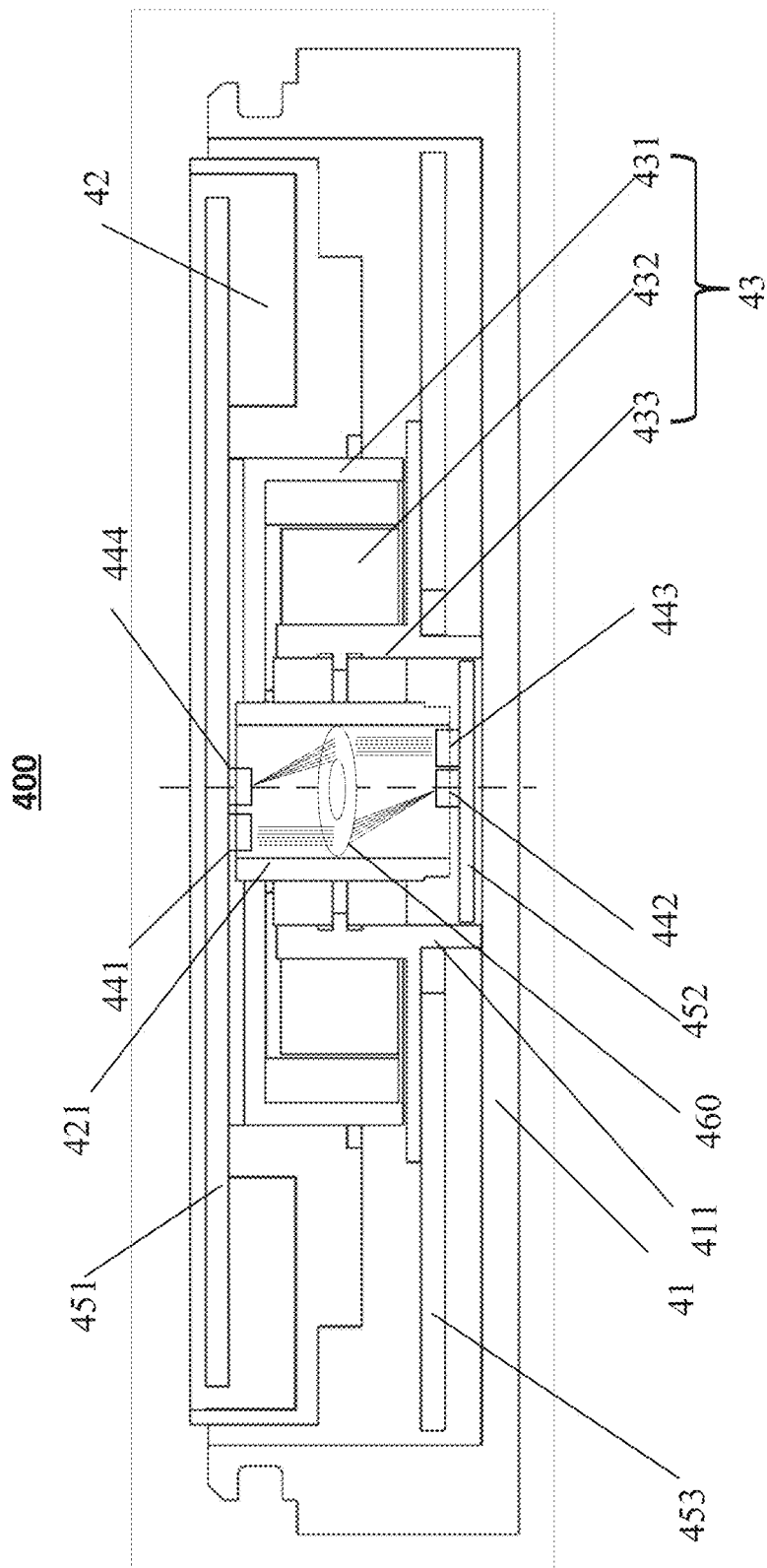
FIG. 11 shows another optical path diagram of a data transmission apparatus provided by another embodiment of the present disclosure.

In another optional embodiment, the present disclosure further proposes a method for arranging a third optical module in a data transmission apparatus. As shown in FIG. 11, a coupling optical system includes an annular lens. The annular lens 460 is arranged in a hollow structure for converging incident light, and the annular lens 460 is arranged on a rotating shaft. In this embodiment of the present disclosure, the coupling optical system further includes a second collimating module and a third collimating module. The second and third collimating modules include one or more optical lenses. A first optical module 441 and the second collimating module are packaged together. The second collimating module is configured to collimate an optical signal emitted by the first optical module. A third optical module 443 and the third collimating module are packaged together. The third collimating module is configured to collimate an optical signal emitted by the third optical module. The first optical module is arranged at a position on the rotator opposite to the annular lens. A second optical module is arranged at a focal point of the annular lens on the fixing base. The first optical module emits parallel light to the annular lens, and the annular lens receives the parallel light and converges the parallel light to the second optical module. A fourth optical module is arranged at a position on the rotator opposite to a focal point of the annular lens. The third optical module is arranged at a position on the fixing base opposite to the annular lens. The third optical module emits parallel light to the annular lens, and the annular lens receives the parallel light and converges the parallel light to the fourth optical module.

When performing downlink data transmission, the first optical module 441 emits parallel light to the annular lens 460. After converging the parallel light, the annular lens 460 emits the parallel light to the second optical module 442. The second optical module 442 is arranged at the focal point of the annular lens 460, thereby ensuring energy of a signal beam received by the second optical module 442, and implementing high-efficiency reception of the optical signal emitted by the first optical module by the second optical module. In addition, when the annular lens 460 is arranged on the central shaft, the rotator 42 drives the first optical module 441 to rotate when the rotator rotates relative to the fixing base 41, so that the first optical module 441 rotates relative to the annular lens 460. Because the first optical module 441 emits the parallel light to the annular lens 460, and the second optical module 442 is located at the focal point of the annular lens 460, the second optical module 442 may always receive the maximum energy of the optical signal emitted by the first optical module 441. When the annular lens 460 is arranged on the rotating shaft, the annular lens 460 and the first optical module 441 are relatively stationary, thereby more effectively converging the parallel light emitted by the first optical module 441 to the second optical module 442.

When performing uplink data transmission, the third optical module 443 emits parallel light to the annular lens 460. After converging the parallel light, the annular lens 460 emits the parallel light to the fourth optical module 444. Because the fourth optical module 444 is arranged at the focal point of the annular lens 460, the fourth optical module 460 may receive the maximum energy of an optical signal emitted by the third optical module 443, thereby greatly improving a transmission effect of the optical signal. In addition, when the annular lens 460 is arranged on the rotating shaft, the third optical module 443 and the annular lens 460 rotate relative to each other, and the fourth optical module 444 and the annular lens 460 are relatively stationary. Because the third optical module 443 emits the parallel light to the annular lens 460, and the fourth optical module 444 is located at the focal point of the annular lens 460, the fourth optical module 444 may always receive the maximum energy of the optical signal emitted by the third optical module 443.

It may be seen from the foregoing embodiments that the annular lens is arranged, and the optical modules receiving the uplink data and the downlink data are all located at the focal point of the annular lens. This may ensure transmission efficiency of both uplink data transmission and downlink data transmission. In addition, an uplink optical signal and a downlink optical signal are transmitted in different optical paths, thereby effectively avoiding mutual interference between the optical signals and achieving an optimal transmission effect of the optical signal.

An embodiment of the present disclosure further provides an intelligent sensing device. The intelligent sensing apparatus includes a LiDAR system. The LiDAR system in this embodiment has the same structure and function as the LiDAR system in the foregoing embodiment. For the specific structure and function of the LiDAR system, please refer to the foregoing embodiment. Details are not repeated herein.

The intelligent sensing device is a device that may detect an orientation and a distance of a surrounding object and make a decision based on the orientation and the distance of the surrounding object, for example, an intelligent robot, an intelligent car, or an intelligent airplane.

It should be noted that unless otherwise specified, the technical or scientific terms used in the embodiments of the present disclosure should have general meanings understood by a person of ordinary skill in the art to which the embodiments of the present disclosure belong.

In this embodiment of the present disclosure, the LiDAR system 100 of the intelligent sensing device is used to implement the following: a first optical module 11 receives a first digital signal output by a LiDAR front-end apparatus 20, and converts the first digital signal into an optical signal, a coupling optical system 13 transmits an optical signal output by the first optical module 11 to a second optical module 12, and the second optical module 12 converts the optical signal into the first digital signal and outputs the first digital signal to an upper application apparatus 30 for processing. It may be seen that in this embodiment, light is used as a data transmission medium for data transmission. Because of a large communication capacity, great anti-electromagnetic interference performance, and great transmission quality of optical communication, data transmission efficiency may be improved.

In the description of a novel embodiment of this implementation, orientations or position relationships indicated by the technical terms such as "center," "longitudinal," "lateral," "length," "width," "thickness," "above," "under," "front," "rear," "left," "right," "vertical," "horizontal," "top," "bottom," "inner," "outer," "clockwise," "counterclockwise," "axial," "radial," and "circumferential" are based on the orientations or position relationships shown in the accompanying drawings, and are merely intended to describe the present disclosure and simplify the descriptions, but are not intended to indicate or imply that the indicated apparatus or element shall have a specific orientation or be formed and operated in a specific orientation, and therefore cannot be understood as a limitation on the embodiments of the present disclosure.

In addition, the technical terms such as "first" and "second" are merely intended for a purpose of description, and shall not be understood as an indication or implication of relative importance or implicit indication of a quantity of indicated technical features. In the description of the embodiments of the present disclosure, "a plurality of" means two or more, unless otherwise specifically defined.

In the description of the novel embodiment of this implementation, unless otherwise clearly specified and limited, the technical terms such as "mounting," "connected," "connection," and "fixing" shall be understood in a general sense. For example, these technical terms may be a fixed connection, a detachable connection, or an integrated connection; or may be a mechanical connection or an electrical connection; or may be a direct connection, an indirect connection by using an intermediate medium, or an internal communication of two elements or an interaction of two elements. A person of ordinary skill in the art may understand specific meanings of the foregoing terms in the embodiments of the present disclosure according to a specific situation.

In the description of the embodiments of the present disclosure, unless otherwise clearly specified and defined, that a first feature is "above" or "under" a second feature may be that the first feature and the second feature are in direct contact, or the first feature and the second feature are in indirect contact through an intermediate medium. Moreover, that a first feature is "above," "over," and "on" a second feature may be that the first feature is right above or not right above the second feature, or may merely indicate that a horizontal height of the first feature is greater than that of the second feature. That a first feature is "below," "underneath," and "under" a second feature may be that the first feature is right below or not right below the second feature, or may merely indicate that a horizontal height of the first feature is less than that of the second feature.

Finally, it should be noted that the foregoing embodiments are intended for describing instead of limiting the technical solutions of the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but includes all technical solutions that fall within the scope of the claims.

What is claimed is:

1. A LiDAR system, comprising:
a first data transmission apparatus and a second data transmission apparatus, wherein the first data transmission apparatus and the second data transmission apparatus are located in the LiDAR system; and
a rotator and a central shaft, wherein the rotator is connected with the central shaft through a bearing, the rotator is connected to a bearing rotor, and the central shaft is connected to a bearing stator, wherein
the first data transmission apparatus comprises a first optical module and a second optical module;

the first optical module comprises a first demodulation circuit and a first receiver;

the second optical module comprises a second emitter and a second modulation circuit;

the second optical module is arranged on the bearing stator;

the second modulation circuit is configured to modulate a second digital signal output by an upper application apparatus into an optical signal;

the second emitter is configured to receive the optical signal output by the second modulation circuit, and used as an emitting terminal of the second optical module for emitting the optical signal to the first receiver;

the first optical module is arranged on the bearing rotor, and the first receiver of the first optical module is used as a receiving terminal of the first optical module for receiving the optical signal, and outputting the optical signal to the first demodulation circuit;

the first demodulation circuit is configured to demodulate the optical signal into the second digital signal, and send the second digital signal to a radar front-end apparatus;

the first receiver and the second emitter are oppositely arranged on an axis of the central shaft;

the second data transmission apparatus comprises a third optical module, a coupling optical system, and a fourth optical module;

the third optical module is disposed on the rotator, and the fourth optical module is disposed on the center shaft;

the coupling optical system comprises an annular lens, and the annular lens is eccentrically arranged around the central shaft;

a receiving terminal of the fourth optical module is arranged at an image-side focal plane of the annular lens;

the third optical module is configured to receive a first digital signal output by the radar front-end apparatus, and convert the first digital signal into an optical signal, and emitting the optical signal to the annular lens in parallel to an optical axis of the annular lens;

the annular lens converges a propagation direction of the optical signal output by the third optical module, and emits the optical signal to a receiving terminal of the fourth optical module; and the fourth optical module is configured to convert the optical signal into the first digital signal, and output the first digital signal to the radar front-end apparatus, wherein the first data transmission apparatus further comprises a coupling optical system, wherein the coupling optical system is arranged between the receiving terminal of the first optical module and the emitting terminal of the second optical module, and an optical lens group is arranged on the coupling optical system, and wherein the optical lens group is configured to couple an optical signal emitted by the emitting terminal of the second optical module to the receiving terminal of the first optical module.

2. The LiDAR system of claim 1, wherein the optical lens group is a collimating lens group, and the collimating lens group is configured to change the optical signal emitted by the emitting terminal of the second optical module into a collimated optical signal, and wherein converge the collimated optical signal to the receiving terminal of the first optical module.

3. The LiDAR system of claim 1, wherein the optical lens group is a spherical lens, and the spherical lens is configured to converge the optical signal emitted by the emitting terminal of the second optical module to the receiving terminal of the first optical module.

4. The LiDAR system of claim 1, wherein the LiDAR system further comprises a first communication port and a second communication port, the first communication port is separately connected to the first modulation circuit and the radar front-end apparatus, and the second communication port is connected to a second demodulation circuit and the radar front-end apparatus.

* * * * *